United States Patent
Kasher et al.

(10) Patent No.: US 10,264,492 B2
(45) Date of Patent: Apr. 16, 2019

(54) APPARATUS, METHOD AND SYSTEM OF ESTABLISHING A TRANSMISSION OPPORTUNITY (TXOP)

(71) Applicant: INTEL CORPORATION, Santa Clara, CA (US)

(72) Inventors: Assaf Kasher, Haifa (IL); Carlos Cordeiro, Portland, OR (US); Solomon B. Trainin, Haifa (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/788,073

(22) Filed: Oct. 19, 2017

(65) Prior Publication Data

US 2018/0103396 A1    Apr. 12, 2018

Related U.S. Application Data

(63) Continuation of application No. 15/296,086, filed on Oct. 18, 2016, now Pat. No. 9,826,435, which is a
(Continued)

(51) Int. Cl.
*H04W 28/26* (2009.01)
*H04B 10/90* (2013.01)
(Continued)

(52) U.S. Cl.
CPC .......... *H04W 28/26* (2013.01); *H04B 10/90* (2013.01); *H04L 5/00* (2013.01); *H04L 5/0094* (2013.01);
(Continued)

(58) Field of Classification Search
CPC ............. H04W 28/26; H04W 72/0446; H04W 72/0453; H04W 74/0816
See application file for complete search history.

(56) References Cited

U.S. PATENT DOCUMENTS 6,278,690 B1 * 8/2001 Herrmann ............. H04L 12/437
  370/224
9,504,038 B2    11/2016 Kasher et al.
(Continued)

FOREIGN PATENT DOCUMENTS

RU         2505928       1/2014
WO       2011043901      4/2011
(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
(Continued)

*Primary Examiner* — Ronald B Abelson
(74) *Attorney, Agent, or Firm* — Shichrur & Co.

(57) ABSTRACT

Some demonstrative embodiments include apparatuses, devices, systems and methods of communicating a wide-bandwidth data frame. For example, an apparatus may include a controller to generate at least one wide-bandwidth data frame to be transmitted over a wide-bandwidth millimeter-Wave (mmWave) channel, the wide-bandwidth mmWave channel including a plurality of mmWave channels; and a transmitter to transmit a plurality of reservation frames over the plurality of mmWave channels, a reservation frame of the plurality of reservation frames including a duration value corresponding to a duration of the wide-bandwidth data frame and a wide-bandwidth indication to indicate that the wide-bandwidth data frames are to be transmitted over the wide-bandwidth mmWave channel, the transmitter to transmit the at least one wide-bandwidth data frame over the wide-bandwidth mmWave channel.

27 Claims, 8 Drawing Sheets

Related U.S. Application Data continuation of application No. 14/583,146, filed on Dec. 25, 2014, now Pat. No. 9,504,038.

(51) Int. Cl.
| | | |
|---|---|---|
| *H04W 72/04* | (2009.01) | |
| *H04L 5/00* | (2006.01) | |
| *H04W 74/08* | (2009.01) | |
| *H04B 7/06* | (2006.01) | |

(52) U.S. Cl.
CPC ... *H04W 72/0446* (2013.01); *H04W 72/0453* (2013.01); *H04W 74/0816* (2013.01); *H04B 7/06* (2013.01)

(56) References Cited

U.S. PATENT DOCUMENTS

| | | | |
|---|---|---|---|
| 9,826,435 | B2 | 11/2017 | Kasher et al. |
| 2002/0046280 | A1* | 4/2002 | Fujita ............... H04L 12/5601 709/227 |
| 2002/0144263 | A1* | 10/2002 | Eldering ............ G06Q 30/02 725/34 |
| 2004/0213204 | A1* | 10/2004 | Yang ............... H04L 12/6418 370/352 |
| 2007/0280157 | A1 | 12/2007 | Kwon et al. |
| 2008/0144729 | A1* | 6/2008 | Miyoshi ............. H04L 27/28 |
| 2010/0022261 | A1 | 1/2010 | Meier et al. |
| 2011/0038356 | A1 | 2/2011 | Bachrach |
| 2011/0135023 | A1* | 6/2011 | Kwon ............... H04W 42/00 |
| 2011/0194542 | A1 | 8/2011 | Kim et al. |
| 2011/0305156 | A1* | 12/2011 | Liu ................. H04L 5/0037 370/252 |
| 2012/0008599 | A1 | 1/2012 | Marin et al. |
| 2012/0177017 | A1 | 7/2012 | Gong et al. |
| 2012/0327870 | A1* | 12/2012 | Grandhi ............ H04W 28/06 370/329 |
| 2013/0070668 | A1 | 3/2013 | Merlin et al. |
| 2013/0088983 | A1* | 4/2013 | Pragada ............ H04W 16/14 370/252 |
| 2013/0155953 | A1 | 6/2013 | Chu et al. |
| 2014/0071892 | A1 | 3/2014 | Liu et al. |
| 2014/0185497 | A1 | 7/2014 | Wolf et al. |
| 2015/0351135 | A1 | 12/2015 | Schmidt et al. |
| 2016/0077202 | A1 | 3/2016 | Hirvonen et al. |
| 2016/0119046 | A1* | 4/2016 | Trainin ............. H04B 7/0617 375/267 |
| 2016/0149631 | A1* | 5/2016 | Sanderovich ........ H04B 7/0684 |
| 2016/0164800 | A1 | 6/2016 | Eitan et al. |
| 2017/0280157 | A1 | 9/2017 | Jeon et al. |

FOREIGN PATENT DOCUMENTS

| | | |
|---|---|---|
| WO | 2011099729 | 8/2011 |
| WO | 2012040495 | 3/2012 |
| WO | 2012096767 | 7/2012 |
| WO | 2014009250 | 1/2014 |

OTHER PUBLICATIONS

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.
IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.
Wireless Gigabit Alliance (WGA) Specifications; WiGig MAC and PHY Specification Version 1.1, Apr. 2011—Final Specification; 442 pages.
U.S. Appl. No. 14/293,878, filed Jun. 2, 2014, 50 pages.
International Search Report and Written Opinion for PCT/US2015/062627, dated Feb. 29, 2016, 9 pages.
Sundeep Rangan et al., 'Millimeter-Wave Cellular Wireless Networks: Potencials and Challenges'. Proceedings of the IEEE, vol. 102, Issue:3 pp. 366-385, Feb. 5, 2014, 21 pages.
Notice of Allowance for U.S. Appl. No. 14/583,146, dated Jul. 19, 2016, 26 pages.
Notice of Allowance for U.S. Appl. No. 15/296,086, dated Jul. 17, 2017, 14 pages.
International Preliminary Report on Patentability for PCT/US2015/062627, dated Jul. 6, 2017, 6 pages.
Office Action for Russian Patent Application No. 2017118147, dated Jun. 14, 2018, 8 pages (Including 2 pages of English translation).
European Search Report for European Patent Application No. 15874034.0, dated Jul. 17, 2018, 9 pages.
European Search Report for European Patent Application No. 18168086.9, dated Jul. 18, 2018, 12 pages.
"Wireless LAN at 60 GHz-IEEE 802.11ad Explained Application Note", May 30, 2013 (May 30, 2013), XP055259363, Retrieved from the Internet: URL:http://cp.literature.agilent.com/litwe b/pdf/5990-9697EN.pdf, 28 pages.
Nitsche Thomas et al: "IEEE 802.11ad: directional 60 GHz communication for multi-Gigabit-per-second Wi-Fi [Invited Paper]", IEEE Communications Magazine, IEEE Service Center, Piscataway, US, vol. 52, No. 12, Dec. 1, 2014 (Dec. 1, 2014), pp. 132-141, XP011567636, ISSN: 0163-6804, DOI: 10.1109/MCOM.2014.6979964,10 pages.
Carlos Cordeiro et al: "IEEE 802.11ad: Introduction and Performance Evaluation of the First Multi-Gpbs WiFi Technology", Proceedings of the 2010 ACM International Workshop on MMWAVE Communications From Circuits to Networks; Chicago, IL, USA; Sep. 20-24, 2010, ACM, New York, USA, Sep. 24, 2010 (Sep. 24, 2010), pp. 3-8, XP058087104, DOI: 10.1145/1859964.1859968 ISBN: 978-1-4503-0142-8, 5 pages.
Zaaimia MZ et al: "Design and performance evaluation of 802.11ad phys in 60 GHz multipath fading channel", 2013 8th International Workshop on Systems, Signal Processing and Their Applications (WOSSPA), IEEE, May 12, 2013 (May 12, 2013), pp. 521-525, XP032484592, DOI: 10.1109/WOSSPA.2013.6602418, 5 pages.
Gong M X et al: Channel Bounding and MAC Protection Mechanisms for 802.11ac, Global Telecommunications Conference (GLOBECOM 2011), 2011 IEEE, IEEE, Dec. 5, 2011 (Dec. 5, 2011), pp. 1-5, XP032119068, DOI: 10.1109/GLOCOM.2011.6133869 ISBN: 978-1-4244-9266-4, 5 pages.
Office Action for Russian Patent Application No. 2017118147, dated Nov. 8, 2018, 7 pages (Including 3 pages of English translation).

\* cited by examiner

APPARATUS, METHOD AND SYSTEM OF ESTABLISHING A TRANSMISSION OPPORTUNITY (TXOP)

TECHNICAL FIELD

Embodiments described herein generally relate to communicating a wide-bandwidth data frame.

BACKGROUND

A wide-bandwidth data frame is a frame to be transmitted over a wide-bandwidth channel.

The wide-bandwidth channel may include two or more channels. The two or more channels may be contiguous in frequency or may be separated. The wide-bandwidth channel may be created using channel bonding to join the two or more channels.

The wide-bandwidth channel may achieve higher bit rate, e.g., by operating in wider bandwidths.

Wireless devices capable of using the channel bonding may be able to encode and/or to decode the wide-bandwidth data frame.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
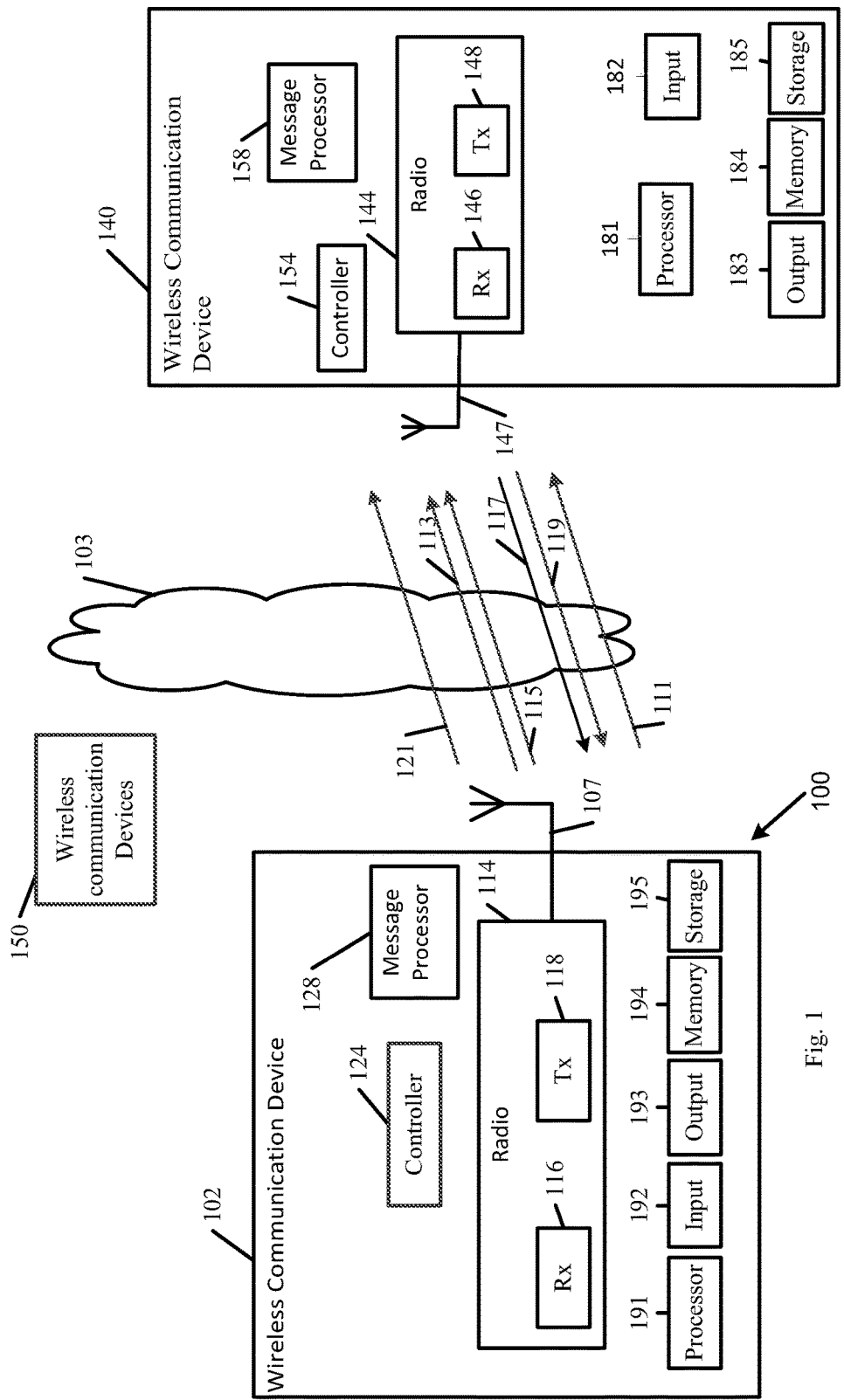
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Bluetooth device, an Internet of Things (IoT) device, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (*Wireless Gigabit Alliance, Inc WiGig MAC and PHY Specification Version* 1.1, April 2011, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*")) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version* 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, a wireless communication device 140, and one or more wireless communication devices 150.

In some demonstrative embodiments, devices 102 and/or 140 may include a mobile device or a non-mobile, e.g., a static, device. For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and a storage unit 195; and/or device 140 may include, for example, one or more of a processor 181, an input unit 182, an output unit 183, a memory unit 184, and a storage unit 185. Devices 102 and/or 140 may optionally include other suitable hardware components and/or software components.

In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

Processor 191 and/or processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

Input unit 192 and/or input unit 182 includes, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, devices 102 and 140 may include one or more radios to perform wireless communication between devices 102, 140, and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include a receiver 116, and/or radio 144 may include a receiver 146.

In some demonstrative embodiments, radios 114 and/or 144 may include one or more wireless transmitters (Tx) including circuitry and/or logic to send wireless communication signals, RF signals, frames, blocks, transmission streams, packets, messages, data items, and/or data. For example, radio 114 may include a transmitter 118, and/or radio 144 may include a transmitter 148.

In some demonstrative embodiments, radios 114 and/or 144 may include modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In other example, device 102 may include two or more antennas 107.

In one example, device 140 may include a single antenna 147. In other example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, WM 103 may include two or more mmWave channels.

In some demonstrative embodiments, the two or more mmWave channels may include DMG channels.

In some demonstrative embodiments, the two or more mmWave channels may include mmWave channels over the 60 GHz band.

In some demonstrative embodiments, devices 102 and 140 may be configured to communicate over a wide-bandwidth mmWave channel.

In some demonstrative embodiments, the wide-bandwidth mmWave channel may include a plurality of mmWave channels.

In one example, the wide-bandwidth mmWave channel may include two mmWave channels.

In another example, the wide-bandwidth mmWave channel may include more than two, e.g., three, mmWave channels.

In some demonstrative embodiments, the plurality of mmWave channels may include two or more contiguous channels, e.g., contiguous in frequency.

In some demonstrative embodiments, the plurality of mmWave channels may include two or more separated channels.

In some demonstrative embodiments, devices 102 and/or 140 may be configured to encode and/or to decode wide-bandwidth frames communicated over the wide-bandwidth mmWave channel.

In some demonstrative embodiments, devices 150 may not be able to encode and/or to decode the wide-bandwidth frames communicated over the wide-bandwidth mmWave channel.

In one example, devices 150 (also referred to as "legacy devices") may operate according to a first protocol, which does not support communication over the wide-bandwidth mmWave channel, and/or devices 102 and/or 140 (also referred to as "non-legacy devices" or "next generation devices") may operate according to a second protocol, which supports communication over the wide-bandwidth mmWave channel.

For example, devices 150 may operate according to the IEEE 802.11ad standard, and/or devices 102 and/or 140 may operate according to a next generation 60 GHz standard, e.g., a next generation of the IEEE 802.11ad standard, and/or any other standard or protocol.

In some demonstrative embodiments, communication between devices 102 and 140 may interfere and/or may create coexistence problems with communication between devices 150.

In one example, devices 150 may not be aware of the communication between devices 102 and 140 over the wide-bandwidth mmWave channel, and/or may interfere with communications between devices 102 and 140 during the communication over the wide-bandwidth mmWave channel, for example, if devices 150 communicate over one or more mmWave channels of the plurality of mmWave channels.

Some demonstrative embodiments may enable the coexistence between devices 102, 140 and 150, e.g., coexistence between the legacy devices and the non-legacy devices.

In some demonstrative embodiments, devices 102 and/or 140 may communicate reservation frames, for example, to reserve the plurality of mmWave channels, and to enable the coexistence between the legacy devices and the next generation devices, e.g., as described below.

In some demonstrative embodiments, devices 102 and/or 140 may include a controller configured to control one or more functionalities of devices 102 and/or 140, for example, one or more functionalities of communication, e.g., communication over the wide-bandwidth mmWave channel, between devices 102 and/or 140 and/or other devices, and/or any other functionality, e.g., as described below. For example, device 102 may include a controller 124, and/or device 140 may include a controller 154.

In some demonstrative embodiments, controllers 124 and/or 154 may include circuitry and or logic, e.g., one or more processors including circuitry, memory circuitry, Media-Access Control (MAC) circuitry, Physical Layer (PHY) circuitry, and/or any other circuitry, configured to perform the functionality of controllers 124 and/or 154. Additionally or alternatively, one or more functionalities of controllers 124 and/or 154 may be implemented by logic, which may be executed by a machine and/or one or more processors, e.g., as described below.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and or logic, e.g., one or more processors including circuitry, memory circuitry, Media-Access Control (MAC) circuitry, Physical Layer (PHY) circuitry, and/or any other circuitry, configured to perform the functionality of message processors 128 and/or 158. Additionally or alternatively, one or more functionalities of the proximity estimators message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, message processor 128 may generate at least one wide-bandwidth data frame 111 to be transmitted over the wide-bandwidth mmWave channel.

In some demonstrative embodiments, message processor 128 may generate a plurality of wide-bandwidth data frames 111 to be transmitted over the wide-bandwidth mmWave channel.

In some demonstrative embodiments, controller 124 may cause transmitter 118 to transmit one or more reservation frames, e.g., before the transmission of wide-bandwidth data frame 111 over the wide-bandwidth mmWave channel, e.g., as described below.

In some demonstrative embodiments, transmitter 118 may transmit a plurality of reservation frames over the plurality of mmWave channels.

In one example, transmitter 118 may transmit the plurality of reservation frames over the plurality of mmWave channels, for example, to reserve the wide-bandwidth mmWave channel.

In some demonstrative embodiments, the plurality of reservation frames may be decodable over respective channels of the plurality of mmWave channels.

In one example, the plurality of reservation frames may be decodable over the respective channels of the plurality of mmWave channels, for example, to enable devices 150 to decode the plurality of reservation frames.

In some demonstrative embodiments, each reservation frame of the plurality of reservation frames may include a duration value corresponding to a duration of wide-bandwidth data frame 111.

In some demonstrative embodiments, the duration value may indicate a duration to cover a duration of at least a transmission of wide-bandwidth data frame 111.

In some demonstrative embodiments, the duration value may indicate a duration to cover a duration of at least a transmission of wide-bandwidth data frame 111, and a short interframe space (SIFS), e.g., after the transmission of wide-bandwidth data frame 111.

In some demonstrative embodiments, the duration value may indicate a duration to cover the duration of at least the transmission of wide-bandwidth data frame 111, the first SIFS, and a transmission of a response data frame in response to wide-bandwidth data frame 111. The response data frame may include, for example, a wide-bandwidth data frame.

In some demonstrative embodiments, the duration value may indicate a duration to cover a sequence of transmissions, including the transmission of wide-bandwidth data frame 111, the response to wide-bandwidth data frame 111, and another wide-bandwidth data frame.

In some demonstrative embodiments, the duration value may indicate a duration of a transmit opportunity (TxOP) during which wide-bandwidth data frame 111 may be transmitted.

In some demonstrative embodiments, the duration value may cover the entire TxOP.

In one example, the duration value may include a total time of a duration of transmission of wide-bandwidth data frame 111, a first SIFS, the time period to transmit the response data frame, a second SIFS, e.g., after the transmission of the response frame, and/or a remaining time of the TxOP.

In other embodiments, the duration field of the reservation frame may include any other duration.

In some demonstrative embodiments, each reservation frame of the plurality of reservation frames may include a wide-bandwidth indication to indicate that the wide-bandwidth data frame is to be transmitted over the wide-bandwidth mmWave channel.

In some demonstrative embodiments, the wide-bandwidth indication may indicate over which mmWave channels of the two or more mmWave channels of WM 103 wide-bandwidth data frame 111 is to be transmitted, e.g., as described below.

In one example, WM 103 may include a first mmWave channel, a second mmWave channel, a third mmWave channel, and a fourth mmWave channel; and the wide-bandwidth mmWave channel may include the second and the third mmWave channels. According to this example, transmitter 116 may transmit a reservation frame 113 over the second mmWave channel to reserve the second mmWave channel, and a reservation frame 115 over the third mmWave channel to reserve the third mmWave channel. Reservation frames 113 and/or 115 may include the wide-bandwidth indication indicating the second and third mmWave channels, and the duration of the TxOP during which wide-bandwidth data frame 111 is to be transmitted.

In some demonstrative embodiments, devices 150 may receive at least one reservation frame of the plurality of reservation frames. In one example, devices 150 may receive reservation frame 115.

In some demonstrative embodiments, devices 150 may decode frame 115 and may be aware of the duration of the TxOP during which wide-bandwidth data frame 111 is to be transmitted, and of the plurality of mmWave channels included in the wide-bandwidth mmWave channel. As a result, devices 150 may not interfere with transmission of wide-bandwidth data frame 111.

In other embodiments, devices 150 may decode another frame communicated between devices 102 and/or 140, for example, a response to the reservation frame, e.g., as described below, and/or an acknowledge frame, and may be aware of the duration of the TxOP.

In some demonstrative embodiments, device 140 may receive at least one reservation frame of the plurality of reservation frames over at least one mmWave channel of the plurality of mmWave channels.

In one example, receiver 146 may receive reservation frame 113 over the second mmWave channel, and/or reservation frame 115 over the third mmWave channel.

In some demonstrative embodiments, message processor 158 may generate at least one response frame, e.g., in response to the at least one reservation frame.

In some demonstrative embodiments, the response frame may be configured to acknowledge the reservation frame.

In some demonstrative embodiments, transmitter 148 may transmit the at least one response frame over the at least one mmWave channel.

In some demonstrative embodiments, the at least one response frame may include a duration field.

In some demonstrative embodiments, the duration field may include a total response time including the total time of the duration field in the control frame minus the duration of transmission of wide-bandwidth data frame 111 and the first SIFS. In other embodiments, the duration field of the response frame may include any other duration.

In one example, message processor 158 may generate a response frame 117, e.g., in response to reservation frame 113, and transmitter 148 may transmit response frame 117 over the second mmWave channel; and/or message processor 158 may generate a response frame 119, e.g., in response to reservation frame 115, and transmitter 148 may transmit response frame 119 over the third mmWave channel.

In some demonstrative embodiments, devices 150 may receive at least one response frame of response frames 117 and/or 119. In one example, devices 150 may receive response frame 117.

In some demonstrative embodiments, devices 150 may decode response frame 117 and may be aware of the duration of the TxOP during which wide-bandwidth data frame 111 is to be transmitted, e.g., as described above.

In some demonstrative embodiments, receiver 116 may receive, e.g., prior to the transmission of wide-bandwidth data frame 111, a plurality of response frames over the plurality of mmWave channels.

In one example, receiver 116 may receive response frame 117 over the second mmWave channel, and response frame 119 over the third mmWave channel.

In some demonstrative embodiments, transmitter 118 may transmit wide-bandwidth data frame 111 over the wide-bandwidth mmWave channel.

In some demonstrative embodiments, transmitter 118 may transmit wide-bandwidth data frame 111, for example, based on response frames 117 and/or 119, which acknowledge the request to transmit wide-bandwidth data frame 111 over the wide-bandwidth mmWave channel.

In some demonstrative embodiments, receiver 146 may receive wide-bandwidth data frame 111 over the wide-bandwidth mmWave channel.

In some demonstrative embodiments, message processor 158 may process wide-bandwidth data frame 111.

In some demonstrative embodiments, transmitter 118 may transmit a plurality of Contention Free-End (CF-End) frames over the plurality of mmWave channels to indicate completion of the transmission of wide-bandwidth data frame 111.

In some demonstrative embodiments, transmitter 118 may transmit the plurality of CF-End frames over the same plurality of mmWave channels used to transmit the plurality of reservation frames, for example, to free the plurality of mmWave channels reserved for the transmission of wide-bandwidth data frame 111.

In some demonstrative embodiments, devices 150 may receive at least one CF-End frame from the plurality of CF-End frames.

In some demonstrative embodiments, devices 150 may be allowed to communicate over the plurality of mmWave channels, for example, once the CF-End frame is received.

In one example, transmitter 118 may transmit the CF-End frames over the second and third mmWave channels to indicate the completion of the transmission of wide-bandwidth data frame 111. Devices 150 may receive at least one of the CF-End frames, which may enable devices 150 to communicate over the second and/or third mmWave channels.

In some demonstrative embodiments, transmitter 118 may transmit at least one reservation frame of the reservation frames over a control mmWave channel. The control mmWave channel may include, for example, a predefined channel, which may be designated for control messages. For example, devices of system 100 may be configured to listen to the control channel, e.g., to receive one or more control messages.

In one example, transmitter 118 may transmit reservation frame 115 over the control mmWave channel.

In some demonstrative embodiments, receiver 146 may receive the at least one reservation frame over the control mmWave channel, and transmitter 148 may transmit a response frame to device 102 over the control mmWave channel, e.g., in response to the at least one reservation frame.

In one example, receiver 146 may receive reservation frame 115 over the control mmWave channel, and may transmit response frame 119 to device 102 over the control mmWave channel, e.g., in response to reservation frame 115.

According to these embodiments, transmitting the reservation frame over the control channel may enable the devices of system 100 to receive the reservation frame and to avoid communication over the plurality of mmWave channels based on a duration indicated by the reservation frame. For example, the reservation frame may include information, e.g., as part of a PHY header and/or MAC header of the reservation frame, to indicate which channels are to be reserved.

In some demonstrative embodiments, the plurality of reservation frames may include Request To Send (RTS) frames.

In some demonstrative embodiments, the plurality of response frames may include Clear To Send (CTS) frames.

Figure 2A:
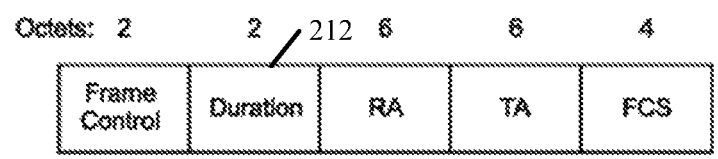
FIG. 2A is a schematic illustration of a structure of a Request To Send (RTS) frame, in accordance with some demonstrative embodiments.
Figure 2B:
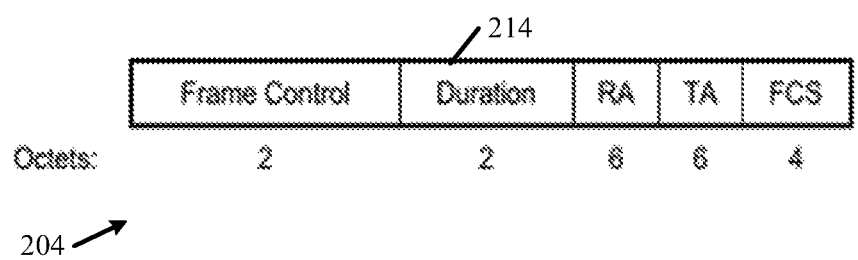
FIG. 2B is a schematic illustration of a structure of a Clear To Send (CTS) frame, in accordance with some demonstrative embodiments.

Reference is made to FIG. 2A, which schematically illustrates a structure of an RTS frame 202, and to FIG. 2B which schematically illustrates a structure of a CTS frame 204, in accordance with some demonstrative embodiments.

In one example, transmitter 118 (FIG. 1) may transmit a plurality of RTS frames 202 over the plurality of mmWave channels, and/or receiver 116 (FIG. 1) may receive a plurality of CTS frames 204 over the plurality of mmWave channels.

As shown in FIG. 2A, RTS frame 202 may include a duration field 212 to indicate the duration of the TxOP during which wide-bandwidth data frame 111 (FIG. 1) is to be transmitted.

As shown in FIG. 2B, CTS frame 202 may include a duration field 214 to indicate the duration of the TxOP during which wide-bandwidth data frame 111 (FIG. 1) is to be transmitted.

Referring back to FIG. 1, in some demonstrative embodiments, the wide-bandwidth indication may be represented by one or more bits of a control physical layer (PHY) header of the reservation frame.

In some demonstrative embodiments, the wide-bandwidth indication may be represented by one or more bits of the control PHY header of the RTS frame.

In some demonstrative embodiments, the control PHY header may include a plurality of fields, e.g., as follows:

TABLE 1

| Field name | Number of bits | Starting bit | Description |
| --- | --- | --- | --- |
| Reserved | 1 | 0 | Set to 0 (differential detector initialization). |
| Scrambler Initialization | 4 | 1 | Bits X1-X4 of the initial scrambler state. |
| Length | 10 | 5 | Number of data octets in the PSDU. Range 14-1023 |
| Packet Type | 1 | 15 | As defined in Table 21-17 (SC header fields). |
| Training Length | 5 | 16 | Length of the training field. The use of this field is defined in 21.10.2.2.3 (BRP packet header fields). |
| Turnaround | 1 | 21 | As defined in Table 21-1 (TXVECTOR and RXVECTOR parameters). |
| Reserved bits | 2 | 22 | Set to 0, ignored by the receiver. |
| HCS | 16 | 24 | Header Check sequence. Calculation of the header check sequence is defined in 21.3.7 (HCS calculation for headers of control PHY, OFDM PHY, and SC PHY). |

In some demonstrative embodiments, the wide-bandwidth indication may be represented by a bit of the reserved bits of the PHY header of table 1.

In some demonstrative embodiments, the reserved bit may be configured to indicate that wide-bandwidth data frame 111 is to be transmitted over the wide-bandwidth mmWave channel. For example, the bit may be set to a predefined value, e.g., "1", to indicate that wide-bandwidth data frame 111 is to be transmitted over the wide-bandwidth mmWave channel.

In some demonstrative embodiments, one or more fields in the PHY header of Table 1 may be used to indicate the plurality of mmWave channels, which are included in the wide-bandwidth mmWave channel.

In one embodiment, two bits of the scrambler initialization bits in the PHY header of Table 1 may be used to indicate which channels are to be used to transmit wide-bandwidth data frame 111.

In one example, the two bits of the scrambler initialization bits in the PHY header of Table 1 may be configured to indicate 4 combinations of channels.

In some demonstrative embodiments, each combination of the 4 combinations may indicate at least one channel, for example, in addition to a channel used by a Personal Basic Service Set Coordination Point (PCP) ("the PCP channel"), e.g., channel 1.

In one example, a first combination of the two scrambler initialization bits, e.g., "00", may indicate a combination of channel 2 in addition to channel 1, e.g., channels 1+2, a second combination of the two scrambler initialization bits, e.g., "01", may indicate a combination of channel 2 and channel 3 in addition to channel 1, e.g., channels 1+2+3, a third combination of the two scrambler initialization bits, e.g., "10", may indicate a combination of channel 3 in addition to channel 1, e.g., channels 1+3, and a fourth combination of the two scrambler initialization bits, e.g., "11", may indicate a combination of channel 4 in addition to channel 1, e.g., channels 1+4. In other embodiments, the two bits of the scrambler initialization bits in the PHY header of Table 1 may include any other values to indicate any other combination of channels.

In another embodiment, an additional byte may be added to the reservation frame, e.g., after a MAC information field, to indicate which channels are being used to transmit wide-bandwidth data frame 111. In one example, the four lower bits of the additional byte may indicate which channels are being used, for example, a bit for each channel. In another example, any other bits may be used to indicate the channels.

In another embodiment, a plurality of bits, for example, three bits, of a plurality of low-density parity-check (LDPC) bits in the header of the RTS frame, may be used to indicate which channels are being used to transmit wide-bandwidth data frame 111, for example, a bit for each channel. Using the three LDPC bits may slightly increase a packet error rate of wide-bandwidth data frame 111. Devices 102 and/or 140 may set the three LDPC bits to zero, e.g., when decoding wide-bandwidth data frame 111, and may set a bit corresponding to a mmWave channel to one to indicate the mmWave channel is being used.

Figure 3:
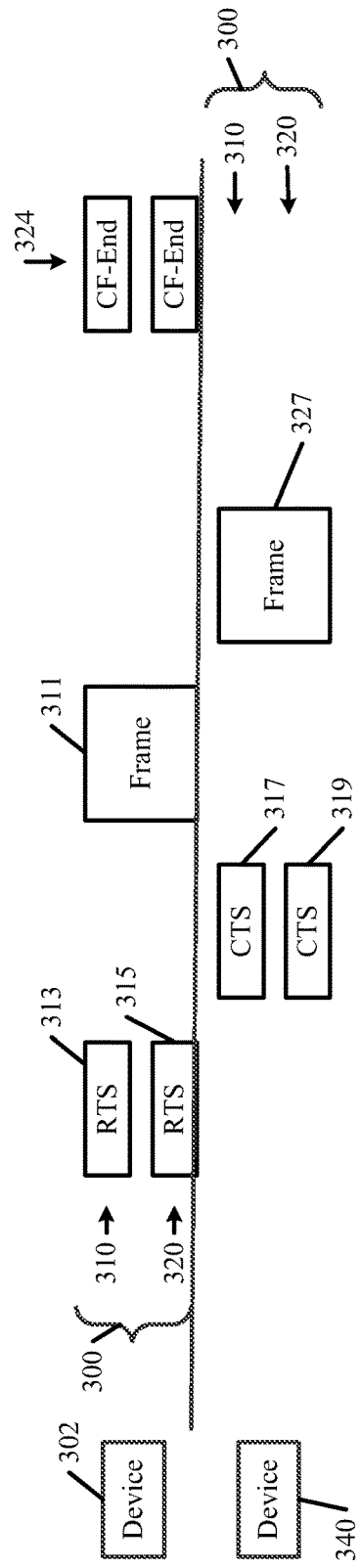
FIG. 3 is a schematic illustration of protecting communication of a wide-bandwidth data frame, in accordance with some demonstrative embodiments.

Reference is made to FIG. 3, which schematically illustrates protecting communication of a wide-bandwidth data frame 311 over a wide-bandwidth mmWave channel 300 between a wireless communication device 302 and a wireless communication device 340, in accordance with some demonstrative embodiments. For example, wide-bandwidth data frame 311 may perform the functionality of wide-bandwidth data frame 111 (FIG. 1), wireless communication device 302 may perform the functionality of wireless communication device 102 (FIG. 1), and/or wireless communication device 340 may perform the functionality of wireless communication device 140 (FIG. 1).

As shown in FIG. 3, wide-bandwidth mmWave channel 300 may include a first mmWave channel 310 and a second mmWave channel 320.

As shown in FIG. 3, device 302 may transmit to device 340 a first RTS frame 313 over mmWave channel 310, and a second RTS frame 315 over mmWave channel 320. For example, RTS frame 313 may perform the functionality of reservation frame 113 (FIG. 1), and/or RTS frame 315 may perform the functionality of reservation frame 115 (FIG. 1).

As shown in FIG. 3, device 340 may transmit a first CTS frame 317 over mmWave channel 310, e.g., in response to RTS frame 313, and a second CTS frame 319 over mmWave channel 320, e.g., in response to RTS frame 315. For example, CTS frame 317 may perform the functionality of response frame 117 (FIG. 1), and/or CTS frame 319 may perform the functionality of response frame 119 (FIG. 1).

As shown in FIG. 3, device 302 may transmit wide-bandwidth data frame 311 to device 340 over wide-bandwidth mmWave channel 300.

As shown in FIG. 3, device 340 may transmit a wide-bandwidth data frame 327 to device 302 over a wide-bandwidth mmWave channel 300, e.g., in response to wide-bandwidth data frame 311.

In some demonstrative embodiments, RTS frames 313 and/or 315 may include a duration value corresponding to a duration of wide-bandwidth data frame 311.

In some demonstrative embodiments, the duration value may cover a duration of at least a transmission of wide-bandwidth data frame 311, e.g., a duration of CTS 317 and wide-bandwidth data frame 311.

In some demonstrative embodiments, the duration value may cover a duration greater than the duration of the transmission of wide-bandwidth data frame 311.

In some demonstrative embodiments, the duration value may cover the transmission of CTS 317, wide-bandwidth data frame 311, and a SIFS, e.g., after the transmission of wide-bandwidth data frame 311.

In some demonstrative embodiments, the duration value may cover the duration of at least the transmission of CTS 317, wide-bandwidth data frame 111, a first SIFS, a transmission of wide-bandwidth data frame 327, and a second SIFS subsequent to wide-bandwidth data frame 327.

In some demonstrative embodiments, the duration value may cover a TxOP, during which wide-bandwidth data frame 311 and wide-bandwidth data frame 327 may be transmitted.

In some demonstrative embodiments, the duration value may cover the entire duration of the TxOP.

In some demonstrative embodiments, the duration value may cover a time period longer than the time actually utilized for communicating wide-bandwidth frames, e.g., frames 311 and/or 327, between devices 302 and 340.

In some demonstrative embodiments, device 302 may truncate the time period protected by the duration of the reservation frame, for example, by transmitting one or more truncation frames, e.g., as described below.

As shown in FIG. 3, device 302 may transmit CF-End frames 324 to device 340 over mmWave channels 310 and 320, for example, to indicate completion of communication between devices 302 and 340, and/or truncation of the TxOP.

Refereeing back to FIG. 1, in some demonstrative embodiments the plurality of reservation frames may include dedicated request frames to reserve the plurality of mmWave channels for the communication of the wide-bandwidth data frame 111.

In some demonstrative embodiments, the plurality of response frames may include dedicated response frames to acknowledge the dedicated request frames.

In some demonstrative embodiments, the dedicated response frames may include control frames.

In one example, devices 102 and 140 may communicate a control frame including a frame control field having a predefined type, e.g., "01", a predefined subtype to indicate the control frame is an extension frame, e.g., "0110", and a control frame extension value, e.g., "1011".

In some demonstrative embodiments, the control frame may include structure 210 (FIG. 2A) and an additional 8-bit field, e.g., including 8 bits.

In one example, the 8 bit field may be configured to indicate a combination of channels, e.g., of up to 8 channels.

In another example, the lower 4 bits of the 8-bit field may indicate which channels are being used to transmit wide-bandwidth data frame 111, e.g., a bit per channel. The upper 4 bits may be reserved.

In other embodiments, the 8-bit field may be used to indicate which channels are being used of 8 half channels.

In some demonstrative embodiments, devices 102 and 140 may communicate the dedicated response frame, e.g., in response to the control frame.

In some demonstrative embodiments, the dedicated response frames may have the same structure of the control frame.

In some demonstrative embodiments, the dedicated response frame and the control frame may be communicated over the same mmWave channel.

In some demonstrative embodiments, the control frame may include a duration field. The duration field may include a total time of a duration of transmission of wide-bandwidth data frame 111, a short interframe space (SIFS), a time period to transmit the dedicated response frame, and the remaining time of the TxOP.

In some demonstrative embodiments, the dedicated response frame may include a duration field. The duration field may include a total response time including, for example, the total time of the duration field in the control frame minus the duration of transmission of wide-bandwidth data frame 111 and the SIFS.

In some demonstrative embodiments, the plurality of reservation frames may include Grant frames.

In some demonstrative embodiments, the plurality of response frames may include Grant Acknowledge (ACK) frames.

In some demonstrative embodiments, a Grant frame may include a duration value to indicate the duration of the TxOP.

In some demonstrative embodiments, the Grant frame may include a BF control field including 4 reserved bits. The 4 reserved bits may be used to indicate over which mmWave channels wide-bandwidth data frame 111 is to be transmitted, e.g., a bit per mmWave channel.

In some demonstrative embodiments, transmitting the reservation frames over the plurality of mmWave channels, e.g., before the transmission of wide-bandwidth data frame 111 over the wide-bandwidth mmWave channel, may enable coexistences between devices 102, 140 and 150, and/or may reduce interference between devices 102, 140 and 150.

Figure 4:
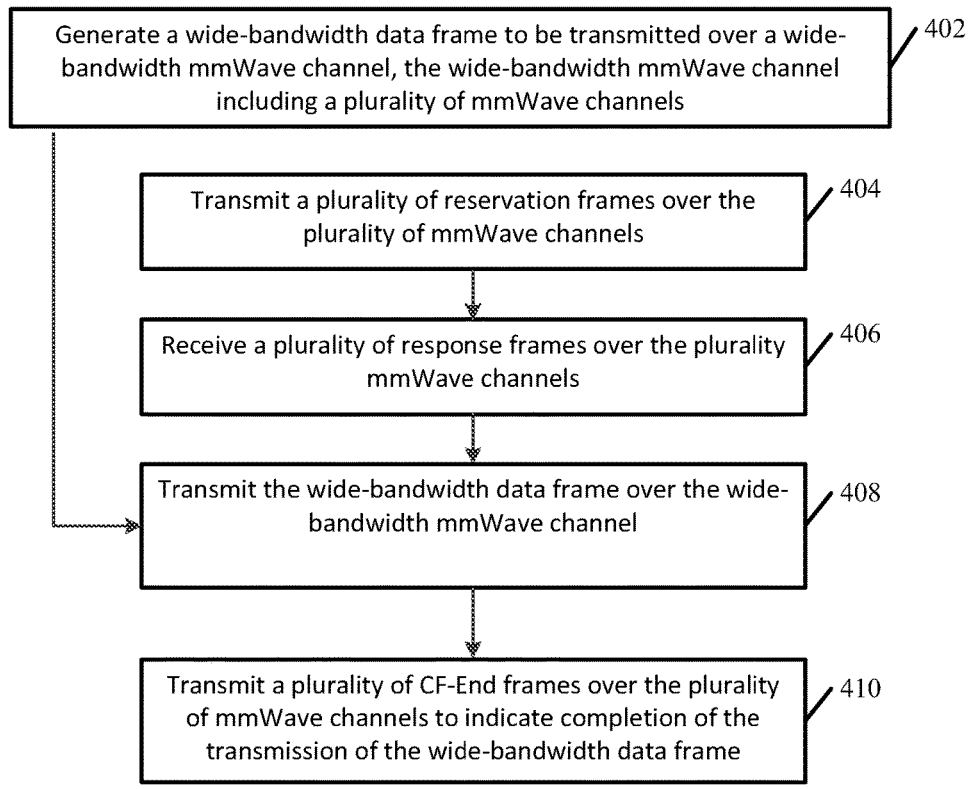
FIG. 4 is a schematic flow chart illustration of a method of communicating a wide-bandwidth data frame, in accordance with some demonstrative embodiments.

Reference is made to FIG. 4, which schematically illustrates a method of communicating a wide-bandwidth data frame, in accordance with some demonstrative embodiments. For example, one or more of the operations of the method of FIG. 4 may be performed by a wireless communication system, e.g., system 100 (FIG. 1); a wireless communication device, e.g., devices 102 and/or 140 (FIG. 1); a radio, e.g., radios 114 and/or 144 (FIG. 1); a message processor, e.g., messages processors 128 and/or 158 (FIG. 1); a receiver, e.g., receivers 116 and/or 146 (FIG. 1); a transmitter, e.g., transmitter 118 and/or 148 (FIG. 1); and/or a controller, e.g., controllers 124 and/or 154 (FIG. 1).

As indicated at block 402, the method may include generating a wide-bandwidth data frame to be transmitted over a wide-bandwidth mmWave channel, the wide-bandwidth mmWave channel including a plurality of mmWave channels. For example, message processor 128 (FIG. 1) may generate wide-bandwidth data frame 111 (FIG. 1) to be transmitted over the wide-bandwidth mmWave channel, which includes the plurality of mmWave channels, e.g., as described above.

As indicated at block 404, the method may include transmitting a plurality of reservation frames over the plurality of mmWave channels. For example, transmitter 118 (FIG. 1) may transmit reservation frames 113 and 115 (FIG. 1) over the second and third mmWave channels, e.g., as described above.

As indicated at block 406, the method may include receiving a plurality of response frames over the plurality mmWave channels. For example, receiver 118 (FIG. 1) may receive response frames 117 and 119 (FIG. 1) over the second and third mmWave channels, e.g., as described above.

As indicated at block 408, the method may include transmitting the wide-bandwidth data frame over the wide-bandwidth mmWave channel. For example, transmitter 118

(FIG. 1) may transmit wide-bandwidth data frame 111 (FIG. 1) over the wide-bandwidth mmWave channel, e.g., as described above.

As indicated at block 410, the method may include transmitting a plurality of CF-End frames over the plurality of mmWave channels to indicate completion of the transmission of the wide-bandwidth data frame. For example, transmitter 118 (FIG. 1) may transmit the plurality of CF-End frames over the plurality of mmWave channels to indicate the completion of the transmission of wide-bandwidth data frame 111 (FIG. 1), e.g., as described above.

Referring back to FIG. 1, some demonstrative embodiments may enable the coexistence between the legacy devices and the next generation devices, for example, by adding a portion ("legacy portion") to a wide-bandwidth data frame, e.g., as described below.

In some demonstrative embodiments, the legacy portion may be decoded by the legacy devices, e.g., devices 150, and may be duplicated, e.g., in all of the plurality of mmWave channels, e.g., as described below.

In some demonstrative embodiments, message processor 128 may generate a wide-bandwidth data frame 121 to be transmitted over the wide-bandwidth mmWave channel.

In some demonstrative embodiments, wide-bandwidth data frame 121 may include a first header, a second header, and a data portion.

In some demonstrative embodiments, the first header may perform the functionality of the legacy portion.

In some demonstrative embodiments, transmitter 118 may transmit the first and second headers over each of the plurality of mmWave channels.

In some demonstrative embodiments, transmitter 118 may transmit the same first header and the same second header over each of the plurality of mmWave channels.

In one example, WM 103 may include the first mmWave channel, the second mmWave channel, the third mmWave channel, and the fourth mmWave channel; and the wide-bandwidth mmWave channel may include the second and the third mmWave channels. According to this example, transmitter 116 may transmit the same first header over the second channel and over the third channel, and the same second header over the second channel and over the third channel.

In some demonstrative embodiments, the first header may include an indication of the second header.

In one example, the first header may be decodable by the legacy devices, e.g., devices 150, and the non-legacy devices; and the second header may be decoded by the non-legacy devices, e.g., devices 102 and/or 140.

In some demonstrative embodiments, the second header may include an indication of the wide-bandwidth mmWave channel.

In some demonstrative embodiments, the indication may indicate, which mmWave channels are being used to communicate wide-bandwidth data frame 121. For example, the indication may indicate the second and third mmWave channels.

In some demonstrative embodiments, transmitter 118 may transmit the data portion over the wide-bandwidth mmWave channel.

In some demonstrative embodiments, receiver 146 may receive the first and second headers over each of the plurality of mmWave channels. For example, receiver 146 may receive the same first header over the second channel and over the third channel, and the same second header over the second channel and over the third channel.

In some demonstrative embodiments, receiver 146 may receive the data portion over the wide-bandwidth mmWave channel.

In some demonstrative embodiments, message processor 158 may process wide-bandwidth data frame 121.

In some demonstrative embodiments, devices 150 may receive the first header and may be aware of the transmission of wide-bandwidth data frame 121.

In some demonstrative embodiments, wide-bandwidth data frame 121 may include a wide-bandwidth channel estimate field to estimate the wide-bandwidth mmWave channel.

In one example, controller 158 may estimate the wide-bandwidth mmWave channel, based on the wide-bandwidth channel estimate field.

In some demonstrative embodiments, transmitter 118 may transmit the wide-bandwidth channel estimate field over the wide-bandwidth mmWave channel, e.g., as described below with reference to FIG. 5.

In some demonstrative embodiments, transmitter 118 may transmit the wide-bandwidth channel estimate field between first and second channels of the plurality of mmWave channels, e.g., as described below with reference to FIG. 7.

In one example, transmitter 118 may transmit the wide-bandwidth channel estimate field between the second and third mmWave channels.

In some demonstrative embodiments, using the first and second headers may enable the coexistence between the legacy devices and the next generation devices.

Figure 5:
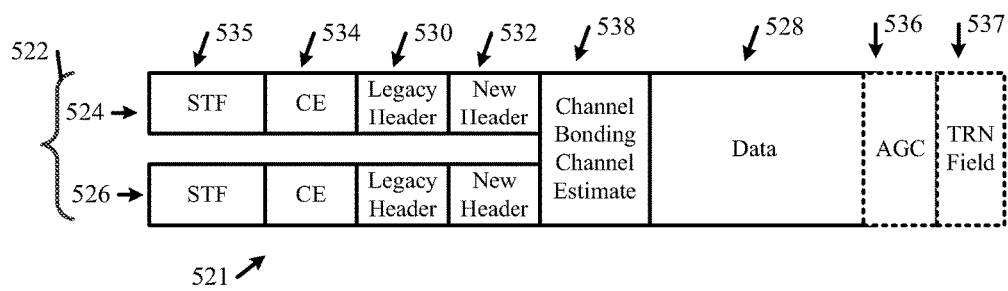
FIG. 5 is a schematic illustration of transmission of a wide-bandwidth data frame, in accordance with some demonstrative embodiments.

Reference is made to FIG. 5, which schematically illustrates a transmission of a wide-bandwidth data frame 521, in accordance with some demonstrative embodiments. For example, wide-bandwidth data frame 521 may perform the functionality of wide-bandwidth data frame 121 (FIG. 1).

In some demonstrative embodiments, device 102 (FIG. 1) may transmit wide-bandwidth data frame 521 to device 140 (FIG. 1).

As shown in FIG. 5, wide-bandwidth data frame 521 may be transmitted over a wide-bandwidth channel 522, which may include a plurality of mmWave channels, e.g., a first mmWave channel 524, and a second mmWave channel 526.

As shown in FIG. 5, wide-bandwidth data frame 521 may include a data portion 528 to be transmitted over wide-bandwidth channel 522.

As shown in FIG. 5, wide-bandwidth data frame 521 may include a first header 530 ("legacy header") to be decoded by the legacy devices, and a second header 532 ("New Header") to be decoded by the next generation devices.

As shown in FIG. 5, the same first header 530 may be transmitted over first mmWave channel 524 and second mmWave channel 526.

As shown in FIG. 5, the same second header 532 may be transmitted over first mmWave channel 524 and second mmWave channel 526.

As shown in FIG. 5, wide-bandwidth data frame 521 may include a channel estimate (CE) field 534 and a short training field (STF) 535 to be transmitted over the plurality of mmWave channels.

In one example, device 102 (FIG. 1) may transmit CE field 534 to device 140 (FIG. 1) over second mmWave channel 526, e.g., to enable device 140 (FIG. 1) to estimate mmWave channel 526.

As shown in FIG. 5, wide-bandwidth data frame 521 may include an automatic gain control (AGC) field 536, and training (TRN) field 537.

As shown in FIG. 5, AGC field 536 and TRN field 537 may be transmitted over wide-bandwidth channel 522.

In other embodiments, AGC field 536 and TRN field 537 may be transmitted over the plurality of mmWave channels. For example, the same AGC field 536 may be transmitted over first mmWave channel 524 and second mmWave channel 526, and the same TRN field 537 may be transmitted over first mmWave channel 524 and second mmWave channel 526.

As shown in FIG. 5, wide-bandwidth data frame 521 may include a wide-bandwidth channel estimate field 538 to estimate wide-bandwidth channel 522.

As shown in FIG. 5, wide-bandwidth channel estimate field 538 may be transmitted over wide-bandwidth channel 522, e.g., to estimate wide-bandwidth channel 522.

In one example, device 102 (FIG. 1) may transmit wide-bandwidth channel estimate field 538 to device 140 (FIG. 1) over wide-bandwidth channel 522, e.g., to enable device 140 (FIG. 1) to estimate wide-bandwidth channel 522.

In some demonstrative embodiments, wide-bandwidth channel estimate field 538 may include a plurality of Golay sequences, e.g., as described below with reference to FIGS. 6A and 6B.

Figure 6A:
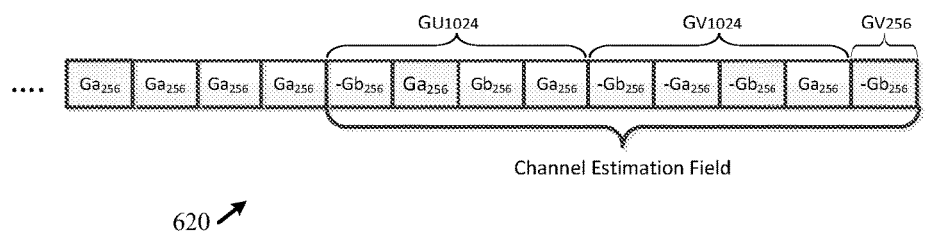
FIG. 6A is a schematic illustration of a structure of a wide-bandwidth channel estimate field for a single carrier (SC) transmission, in accordance with some demonstrative embodiments.
Figure 6B:
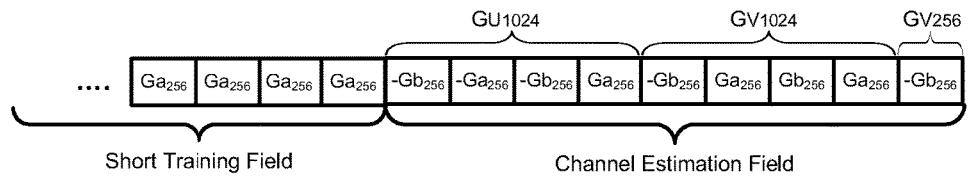
FIG. 6B is a schematic illustration of a structure of a wide-bandwidth channel estimate field for an Orthogonal Frequency-Division Multiple (OFDM) transmission, in accordance with some demonstrative embodiments.

Reference is made to FIG. 6A, which schematically illustrates a structure of a wide-bandwidth channel estimate field 620 for single carrier transmissions, and to FIG. 6B, which schematically illustrates a structure of a wide-bandwidth channel estimate field 630 for OFDM transmissions, in accordance with some demonstrative embodiments.

In one example, device 102 (FIG. 1) may transmit wide-bandwidth channel estimate field 620 to device 140 (FIG. 1), e.g., if devices 102 and 140 (FIG. 1) communicate according to a single carrier scheme.

In another example, device 102 (FIG. 1) may transmit wide-bandwidth channel estimate field 630 to device 140 (FIG. 1), e.g., if devices 102 and 140 (FIG. 1) communicate according to an OFDM scheme.

As shown in FIGS. 6A and/or 6B, wide-bandwidth channel estimate fields 620 and/or 630 may include a plurality of Golay sequences.

In one example, the plurality of Golay sequences may be used to estimate wide-bandwidth channel 522 (FIG. 5).

In some demonstrative embodiments, the plurality of Golay sequences may be longer than a plurality of Golay sequences in CE field 534 (FIG. 5), e.g., to enable device 140 (FIG. 1) to estimate wide-bandwidth channel 522 (FIG. 5).

In one example, wide-bandwidth channel estimate fields 620 and/or 630 may include long Golay sequences, for example, Golay sequences $Ga_{256}$ and $Gb_{256}$, and CE field 534 (FIG. 5) may include short Golay sequences, for example, Golay sequences $Ga_{128}$ and $Gb_{128}$.

In another example, wide-bandwidth channel estimate fields 620 and/or 630 may include long Golay sequences, for example, Golay sequences $GU_{1024}$ and $GV_{1024}$, and CE field 534 (FIG. 5) may include short Golay sequences, for example, Golay sequences $GU_{512}$ and $GV_{512}$.

Figure 7:
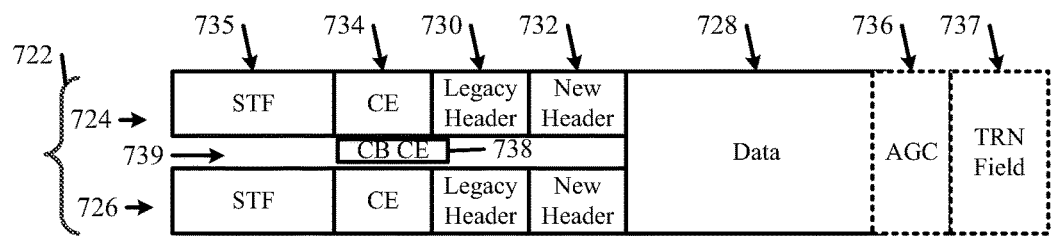
FIG. 7 is a schematic illustration of transmission of a wide-bandwidth data frame, in accordance with some demonstrative embodiments.

Reference is made to FIG. 7, which schematically illustrates a transmission of a wide-bandwidth data frame 721, in accordance with some demonstrative embodiments. For example, wide-bandwidth data frame 721 may perform the functionality of wide-bandwidth data frame 121 (FIG. 1).

In some demonstrative embodiments, device 102 (FIG. 1) may transmit wide-bandwidth data frame 721 to device 140 (FIG. 1).

As shown in FIG. 7, wide-bandwidth data frame 721 may be transmitted over a wide-bandwidth channel 722, which may include a plurality of mmWave channels, e.g., a first mmWave channel 724, and a second mmWave channel 726.

As shown in FIG. 7, wide-bandwidth data frame 721 may include a data portion 728 to be transmitted over wide-bandwidth channel 722.

As shown in FIG. 7, wide-bandwidth data frame 721 may include a first header 730 ("legacy header") to be decoded by the legacy devices and a second header 732 ("New Header") to be decoded by the next generation devices.

As shown in FIG. 7, the same first header 730 may be transmitted over first mmWave channel 724 and second mmWave channel 726.

As shown in FIG. 7, the same second header 732 may be transmitted over first mmWave channel 724 and second mmWave channel 726.

As shown in FIG. 7, wide-bandwidth data frame 721 may include a channel estimate (CE) field 734 and a short training field (STF) 735 to be transmitted over the plurality of mmWave channels.

In one example, device 102 (FIG. 1) may transmit CE field 734 to device 140 (FIG. 1) over second mmWave channel 726, e.g., to enable device 140 (FIG. 1) to estimate mmWave channel 726.

As shown in FIG. 7, wide-bandwidth data frame 721 may include an automatic gain control (AGC) field 736, and training (TRN) field 737.

As shown in FIG. 7, AGC field 736 and TRN field 737 may be transmitted over wide-bandwidth channel 722.

In other embodiments, AGC field 736 and TRN field 737 may be transmitted over the plurality of mmWave channels. For example the same AGC field 736 may be transmitted over first mmWave channel 724 and second mmWave channel 726, and the same TRN field 737 may be transmitted over first mmWave channel 724 and second mmWave channel 726.

As shown in FIG. 7, wide-bandwidth data frame 721 may include a wide-bandwidth channel estimate field 738 to estimate wide-bandwidth channel 722.

As shown in FIG. 7, wide-bandwidth channel estimate field 738 may be transmitted over a narrow bandwidth 739 between the first mmWave channel 724 and the second mmWave channel 726.

In one example, device 102 (FIG. 1) may transmit wide-bandwidth channel estimate field 738, for example, to enable channel estimation in frequencies, which do not have a required amount of energy, e.g., when combining energies of the plurality of mmWave channels.

In one example, device 102 (FIG. 1) may transmit wide-bandwidth channel estimate field 738 to device 140 (FIG. 1) over narrow bandwidth 739, e.g., to enable device 140 (FIG. 1) to estimate wide-bandwidth channel 722, for example, if first mmWave channel 724 and second mmWave channel 726 do not have enough energy required to estimate wide-bandwidth channel 722.

In some demonstrative embodiments, wide-bandwidth channel estimate field 738 may include a plurality of tones to enhance channel estimation of the wide-bandwidth mmWave channel, e.g., as described below with reference to FIG. 8.

Figure 8:
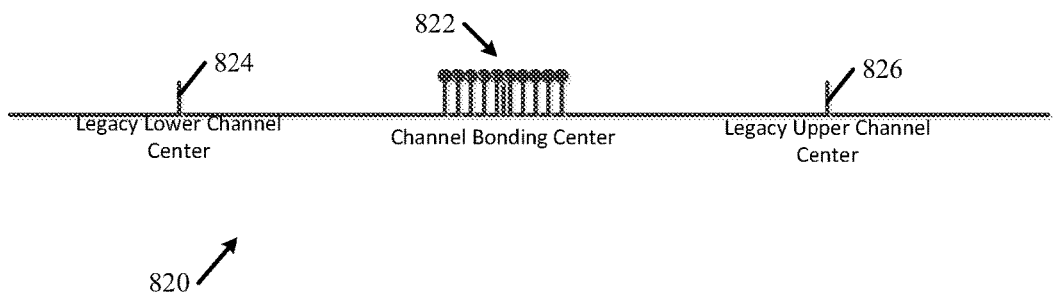
FIG. 8 is a schematic illustration of a structure of a wide-bandwidth channel estimate field, in accordance with some demonstrative embodiments.

Reference is made to FIG. 8, which schematically illustrates a structure of a wide-bandwidth channel estimate field 820, in accordance with some demonstrative embodiments.

In one example, device 102 (FIG. 1) may transmit wide-bandwidth channel estimate field 820 to device 140 (FIG. 1) over narrow bandwidth 739 (FIG. 7), e.g., to estimate wide-bandwidth channel 722 (FIG. 7).

As shown in FIG. 8, wide-bandwidth channel estimate field 820 may include a plurality of tones 822.

As shown in FIG. 8, the plurality of tones 822 may be located between a first lower channel center 824 and a second upper channel center 826.

In one example, first mmWave channel 724 (FIG. 7) may be centered at lower channel center 824, and/or second mmWave channel 726 (FIG. 7) may be centered at upper channel center 826.

In some demonstrative embodiments, the plurality of tones 822 may include a set of about twenty tones having a different pattern, which may be changed every 1024 samples, e.g., if using higher Bandwidth.

In one example, the plurality of tones 822 may be configured to provide data to be used to estimate an area of frequencies between first mmWave channel 724 (FIG. 7) and second mmWave channel 726 (FIG. 7), e.g., an area of about 300 MHz.

In one example, bit values, e.g., −1 and 1, may be predefined for a tone of the plurality of tones 822. The difference between two adjacent tones may be 5.15625 Megahertz (MHz), e.g., 2640/512.

Figure 9:
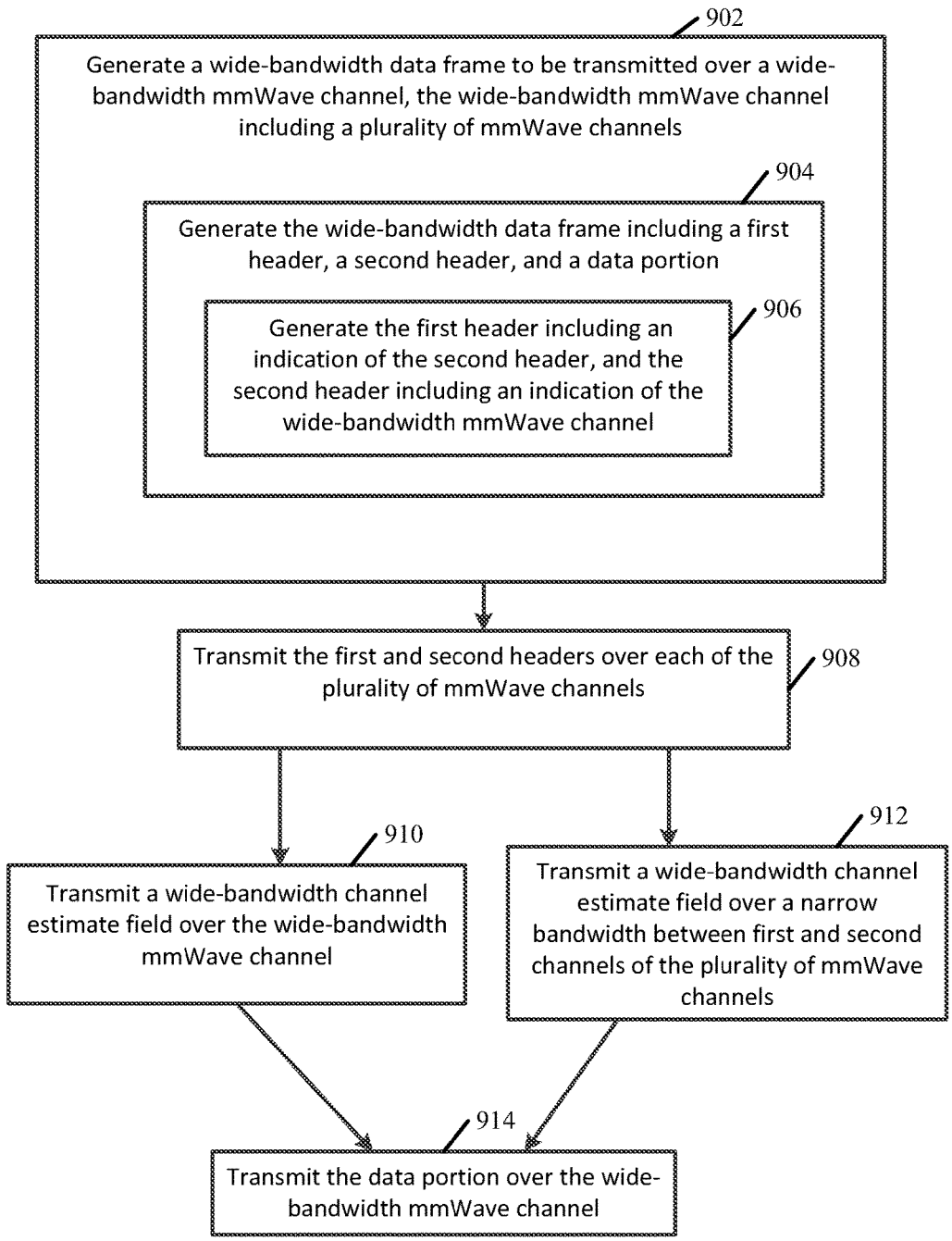
FIG. 9 is a schematic flow chart illustration of a method of communicating a wide-bandwidth data frame, in accordance with some demonstrative embodiments.

Reference is made to FIG. 9, which schematically illustrates a method of communicating a wide-bandwidth data frame, in accordance with some demonstrative embodiments. For example, one or more of the operations of the method of FIG. 9 may be performed by a wireless communication system, e.g., system 100 (FIG. 1); a wireless communication device, e.g., devices 102 and/or 140 (FIG. 1); a radio, e.g., radios 114 and/or 144 (FIG. 1); a message processor, e.g., messages processors 128 and/or 158 (FIG. 1); a receiver, e.g., receivers 116 and/or 146 (FIG. 1); a transmitter, e.g., transmitter 118 and/or 148 (FIG. 1); and/or a controller, e.g., controllers 124 and/or 154 (FIG. 1).

As indicated at block 902, the method may include generating a wide-bandwidth data frame to be transmitted over a wide-bandwidth mmWave channel, the wide-bandwidth mmWave channel including a plurality of mmWave channels. For example, message processor 128 (FIG. 1) may generate wide-bandwidth data frame 121 (FIG. 1) to be transmitted over the wide-bandwidth mmWave channel, which includes the plurality of mmWave channels, e.g., as described above.

As indicated at block 904, generating the wide-bandwidth data frame may include generating the wide-bandwidth data frame including a first header, a second header, and a data portion. For example, message processor 128 (FIG. 1) may generate wide-bandwidth data frame 121 (FIG. 1) including the first header, the second header, and the data portion, e.g., as described above.

As indicated at block 906, generating the wide-bandwidth data frame may include generating the first header including an indication of the second header, and the second header including an indication of the wide-bandwidth mmWave channel. For example, message processor 128 (FIG. 1) may generate the first header including the indication of the second header, and message processor 128 (FIG. 1) may generate the second header including the indication of the wide-bandwidth mmWave channel, e.g., as described above.

As indicated at block 908, the method may include transmitting the first and second headers over each of the plurality of mmWave channels. For example, transmitter 118 (FIG. 1) may transmit the first and second headers over the second and third mmWave channels, e.g., as described above.

As indicated at block 910, the method may include transmitting a wide-bandwidth channel estimate field over the wide-bandwidth mmWave channel. For example, transmitter 118 (FIG. 1) may transmit the wide-bandwidth channel estimate field over the wide-bandwidth mmWave channel, e.g., as described above.

As indicated at block 912, the method may include transmitting a wide-bandwidth channel estimate field over a narrow bandwidth between first and second channels of the plurality of mmWave channels. For example, transmitter 118 (FIG. 1) may transmit the wide-bandwidth channel estimate field over the narrow bandwidth between the second and third mmWave channels, e.g., as described above.

As indicated at block 914, the method may include transmitting the data portion over the wide-bandwidth mmWave channel. For example, transmitter 118 (FIG. 1) may transmit the data portion over the wide-bandwidth mmWave channel, e.g., as described above.

Figure 10:
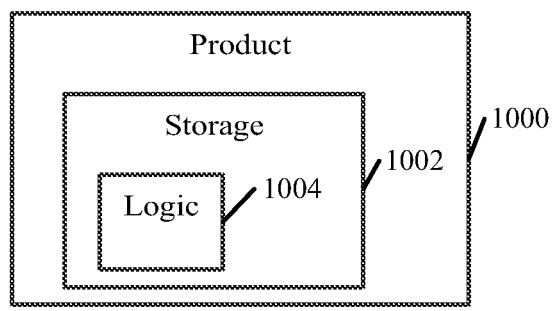
FIG. 10 is a schematic illustration of a product of manufacture, in accordance with some demonstrative embodiments.

Reference is made to FIG. 10, which schematically illustrates a product of manufacture 500, in accordance with some demonstrative embodiments. Product 1000 may include a non-transitory machine-readable storage medium 1002 to store logic 504, which may be used, for example, to perform at least part of the functionality of device 102 (FIG. 1), radio 114 (FIG. 1), controller 124 (FIG. 1), device 140 (FIG. 1), radio 144 (FIG. 1), controller 154 (FIG. 1), (FIG. 1), message processors 128 and/or 158 (FIG. 1) and/or to perform one or more operations of the methods of FIGS. 4 and/or 9. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising a controller to generate a wide-bandwidth data frame to be transmitted over a wide-bandwidth millimeter-Wave (mmWave) channel, the wide-bandwidth mmWave channel including a plurality of mmWave channels; and a transmitter to transmit a plurality of reservation frames over the plurality of mmWave channels, a reservation frame of the plurality of reservation frames including a duration value corresponding to a duration of the wide-bandwidth data frame and a wide-bandwidth indication to indicate that the wide-bandwidth data frame is to be transmitted over the wide-bandwidth mmWave channel, the transmitter to transmit the wide-bandwidth data frame over the wide-bandwidth mmWave channel.

Example 2 includes the subject matter of Example 1, and optionally, wherein the duration value is to cover a duration of at least a transmission of the wide-bandwidth data frame, a short interframe space (SIFS), and a transmission of a response frame to the wide-bandwidth data frame.

Example 3 includes the subject matter of Example 1 or 2, and optionally, wherein the duration value is to indicate a duration of a transmit opportunity (TxOP) during which the wide-bandwidth data frame is to be transmitted.

Example 4 includes the subject matter of any one of Examples 1-3, and optionally, comprising a receiver to receive, prior to the transmission of the wide-bandwidth data frame, a plurality of response frames over the plurality mmWave channels.

Example 5 includes the subject matter of Example 4, and optionally, wherein the plurality of reservation frames includes Request To Send (RTS) frames, and the plurality of response frames includes Clear To Send (CTS) frames.

Example 6 includes the subject matter of Example 4, and optionally, wherein the plurality of reservation frames includes dedicated frames to reserve the plurality of mmWave channels for transmission of the wide-bandwidth data frame, and the plurality of response frames includes dedicated response frames to acknowledge the reservation frames.

Example 7 includes the subject matter of Example 4, and optionally, wherein the plurality of reservation frames includes Grant frames, and the plurality of response frames includes Grant Acknowledge (ACK) frames.

Example 8 includes the subject matter of any one of Examples 1-7, and optionally, wherein the wide-bandwidth indication is represented by one or more bits of a physical layer (PHY) header of the reservation frame.

Example 9 includes the subject matter of any one of Examples 1-8, and optionally, wherein the transmitter is to transmit a plurality of Contention Free-End (CF-End) frames over the plurality of mmWave channels to indicate completion of the transmission of the wide-bandwidth data frame.

Example 10 includes the subject matter of any one of Examples 1-9, and optionally, wherein the transmitter is to transmit at least one of the reservation frames over a control mmWave channel.

Example 11 includes the subject matter of any one of Examples 1-10, and optionally, wherein the wide-bandwidth data frame is decodable over the wide-bandwidth mmWave channel, and the reservation frames are decodable over respective channels of the plurality of mmWave channels.

Example 12 includes the subject matter of any one of Examples 1-11, and optionally, comprising one or more antennas; a memory; and a processor.

Example 13 includes an apparatus comprising a controller to generate a wide-bandwidth data frame to be transmitted over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel; and a transmitter to transmit the first and second headers over each of the plurality of mmWave channels, and to transmit the data portion over the wide-bandwidth mmWave channel.

Example 14 includes the subject matter of Example 13, and optionally, wherein the transmitter is to transmit the same first header and the same second header over each of the plurality of mmWave channels.

Example 15 includes the subject matter of Example 13 or 14, and optionally, wherein the wide-bandwidth data frame includes a wide-bandwidth channel estimate field to estimate the wide-bandwidth mmWave channel.

Example 16 includes the subject matter of Example 15, and optionally, wherein the transmitter is to transmit the wide-bandwidth channel estimate field over the wide-bandwidth mmWave channel.

Example 17 includes the subject matter of Example 15, and optionally, wherein the transmitter is to transmit the wide-bandwidth channel estimate field over a narrow bandwidth between first and second channels of the plurality of mmWave channels.

Example 18 includes the subject matter of any one of Examples 13-17, and optionally, comprising one or more antennas; a memory; and a processor.

Example 19 includes an apparatus comprising a receiver to receive at least one reservation frame over at least one millimeter-Wave (mmWave) mmWave channel, the reservation frame including a duration value corresponding to a duration of a wide-bandwidth data frame and a wide-bandwidth indication to indicate that the wide-bandwidth data frame is to be transmitted over a wide-bandwidth mmWave channel including a plurality of mmWave channels, the plurality of mmWave channels including the at least one mmWave channel; a transmitter to transmit at least one response frame over the mmWave channel; and a message processor to generate the response frame, and to process the wide-bandwidth data frame to be received over the wide-bandwidth mmWave channel.

Example 20 includes the subject matter of Example 19, and optionally, wherein the receiver is to receive a plurality of reservation frames over the plurality of mmWave channels, the message processor is to generate a plurality of response frames, and the transmitter is to transmit the plurality of response frames over the plurality of mmWave channels.

Example 21 includes the subject matter of Example 19 or 20, and optionally, wherein the duration value is to cover a duration of at least a transmission of the wide-bandwidth data frame, a short interframe space (SIFS), and a transmission of the response frame.

Example 22 includes the subject matter of any one of Examples 19-21, and optionally, wherein the duration value is to indicate a duration of a transmit opportunity (TxOP) during which the wide-bandwidth data frame is to be transmitted.

Example 23 includes the subject matter of any one of Examples 19-22, and optionally, wherein the transmitter is to transmit the response frame, prior to the transmission of the wide-bandwidth data frame.

Example 24 includes the subject matter of any one of Examples 19-23, and optionally, wherein the reservation frame includes a Request To Send (RTS) frame, and the response frame includes a Clear To Send (CTS) frame.

Example 25 includes the subject matter of any one of Examples 19-23, and optionally, wherein the reservation frame includes a dedicated frame to reserve the mmWave channel for transmission of the wide-bandwidth data frame, and the response frame includes a dedicated response frame to acknowledge the reservation frame.

Example 26 includes the subject matter of any one of Examples 19-23, and optionally, wherein the reservation frame includes a Grant frame, and the response frame includes a Grant Acknowledge (ACK) frame.

Example 27 includes the subject matter of Example any one of Examples 19-26, and optionally, wherein the wide-bandwidth indication is represented by one or more bits of a physical layer (PHY) header of the reservation frame.

Example 28 includes the subject matter of any one of Examples 19-27, and optionally, wherein the receiver is to receive a Contention Free-End (CF-End) frame indicating completion of the transmission of the wide-bandwidth data frame over the mmWave channel.

Example 29 includes the subject matter of any one of Examples 19-28, and optionally, wherein the receiver is to receive the reservation frame over a control mmWave channel.

Example 30 includes the subject matter of any one of Examples 19-29, and optionally, wherein the wide-bandwidth data frame is decodable over the wide-bandwidth mmWave channel, and the reservation frame is decodable over the mmWave channel.

Example 31 includes the subject matter of any one of Examples 19-30, and optionally, comprising one or more antennas; a memory; and a processor.

Example 32 includes an apparatus comprising a receiver to receive a wide-bandwidth data frame over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel, the receiver to receive the first and second headers over each of the plurality of mmWave channels, and to receive the data portion over the wide-bandwidth mmWave channel; and a message processor to process the wide-bandwidth data frame.

Example 33 includes the subject matter of Example 32, and optionally, wherein the receiver is to receive the same first header and the same second header over each of the plurality of mmWave channels.

Example 34 includes the subject matter of Example 32 or 33, and optionally, wherein the wide-bandwidth data frame includes a wide-bandwidth channel estimate field to estimate the wide-bandwidth mmWave channel.

Example 35 includes the subject matter of Example 34, and optionally, wherein the receiver is to receive the wide-bandwidth channel estimate field over the wide-bandwidth mmWave channel.

Example 36 includes the subject matter of Example 34, and optionally, wherein the receiver is to receive the wide-bandwidth channel estimate field over a narrow bandwidth between first and second channels of the plurality of mmWave channels.

Example 37 includes the subject matter of any one of Examples 32-36, and optionally, comprising one or more antennas; a memory; and a processor.

Example 38 includes a system of wireless communication, the system comprising one or more antennas; a memory; a processor; a controller to generate a wide-bandwidth data frame to be transmitted over a wide-bandwidth millimeter-Wave (mmWave) channel, the wide-bandwidth mmWave channel including a plurality of mmWave channels; and a transmitter to transmit a plurality of reservation frames over the plurality of mmWave channels, a reservation frame of the plurality of reservation frames including a duration value corresponding to a duration of the wide-bandwidth data frame and a wide-bandwidth indication to indicate that the wide-bandwidth data frame is to be transmitted over the wide-bandwidth mmWave channel, the transmitter to transmit the wide-bandwidth data frame over the wide-bandwidth mmWave channel.

Example 39 includes the subject matter of Example 38, and optionally, wherein the duration value is to cover a duration of at least a transmission of the wide-bandwidth data frame, a short interframe space (SIFS), and a transmission of a response frame to the wide-bandwidth data frame.

Example 40 includes the subject matter of Example 38 or 39, and optionally, wherein the duration value is to indicate a duration of a transmit opportunity (TxOP) during which the wide-bandwidth data frame is to be transmitted.

Example 41 includes the subject matter of any one of Examples 38-40, and optionally, comprising a receiver to receive, prior to the transmission of the wide-bandwidth data frame, a plurality of response frames over the plurality mmWave channels.

Example 42 includes the subject matter of Example 41, and optionally, wherein the plurality of reservation frames includes Request To Send (RTS) frames, and the plurality of response frames includes Clear To Send (CTS) frames.

Example 43 includes the subject matter of Example 41, and optionally, wherein the plurality of reservation frames includes dedicated frames to reserve the plurality of mmWave channels for transmission of the wide-bandwidth data frame, and the plurality of response frames includes dedicated response frames to acknowledge the reservation frames.

Example 44 includes the subject matter of Example 41, and optionally, wherein the plurality of reservation frames includes Grant frames, and the plurality of response frames includes Grant Acknowledge (ACK) frames.

Example 45 includes the subject matter of any one of Examples 38-44, and optionally, wherein the wide-bandwidth indication is represented by one or more bits of a physical layer (PHY) header of the reservation frame.

Example 46 includes the subject matter of any one of Examples 38-45, and optionally, wherein the transmitter is to transmit a plurality of Contention Free-End (CF-End) frames over the plurality of mmWave channels to indicate completion of the transmission of the wide-bandwidth data frame.

Example 47 includes the subject matter of any one of Examples 38-46, and optionally, wherein the transmitter is to transmit at least one of the reservation frames over a control mmWave channel.

Example 48 includes the subject matter of any one of Examples 38-47, and optionally, wherein the wide-bandwidth data frame is decodable over the wide-bandwidth mmWave channel, and the reservation frames are decodable over respective channels of the plurality of mmWave channels.

Example 49 includes a system of wireless communication, the system comprising one or more antennas; a memory; a processor; a controller to generate a wide-bandwidth data frame to be transmitted over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel; and a transmitter to transmit the first and second headers over each of the plurality of mmWave channels, and to transmit the data portion over the wide-bandwidth mmWave channel.

Example 50 includes the subject matter of Example 49, and optionally, wherein the transmitter is to transmit the same first header and the same second header over each of the plurality of mmWave channels.

Example 51 includes the subject matter of Example 49 or 50, and optionally, wherein the wide-bandwidth data frame includes a wide-bandwidth channel estimate field to estimate the wide-bandwidth mmWave channel.

Example 52 includes the subject matter of Example 51, and optionally, wherein the transmitter is to transmit the wide-bandwidth channel estimate field over the wide-bandwidth mmWave channel.

Example 53 includes the subject matter of Example 51, and optionally, wherein the transmitter is to transmit the wide-bandwidth channel estimate field over a narrow bandwidth between first and second channels of the plurality of mmWave channels.

Example 54 includes a system of wireless communication, the system comprising one or more antennas; a memory; a processor; a receiver to receive at least one reservation frame over at least one millimeter-Wave (mmWave) mmWave channel, the reservation frame including a duration value corresponding to a duration of a wide-bandwidth data frame and a wide-bandwidth indication to indicate that the wide-bandwidth data frame is to be transmitted over a wide-bandwidth mmWave channel including a plurality of mmWave channels, the plurality of mmWave channels including the at least one mmWave channel; a transmitter to transmit at least one response frame over the mmWave channel; and a message processor to generate the response frame, and to process the wide-bandwidth data frame to be received over the wide-bandwidth mmWave channel.

Example 55 includes the subject matter of Example 54, and optionally, wherein the receiver is to receive a plurality of reservation frames over the plurality of mmWave channels, the message processor is to generate a plurality of response frames, and the transmitter is to transmit the plurality of response frames over the plurality of mmWave channels.

Example 56 includes the subject matter of Example 54 or 55, and optionally, wherein the duration value is to cover a duration of at least a transmission of the wide-bandwidth data frame, a short interframe space (SIFS), and a transmission of the response frame.

Example 57 includes the subject matter of any one of Examples 54-56, and optionally, wherein the duration value is to indicate a duration of a transmit opportunity (TxOP) during which the wide-bandwidth data frame is to be transmitted.

Example 58 includes the subject matter of any one of Examples 54-57, and optionally, wherein the transmitter is to transmit the response frame, prior to the transmission of the wide-bandwidth data frame.

Example 59 includes the subject matter of any one of Examples 54-58, and optionally, wherein the reservation frame includes a Request To Send (RTS) frame, and the response frame includes a Clear To Send (CTS) frame.

Example 60 includes the subject matter of any one of Examples 54-58, and optionally, wherein the reservation frame includes a dedicated frame to reserve the mmWave channel for transmission of the wide-bandwidth data frame, and the response frame includes a dedicated response frame to acknowledge the reservation frame.

Example 61 includes the subject matter of any one of Examples 54-58, and optionally, wherein the reservation frame includes a Grant frame, and the response frame includes a Grant Acknowledge (ACK) frame.

Example 62 includes the subject matter of any one of Examples 54-61, and optionally, wherein the wide-bandwidth indication is represented by one or more bits of a physical layer (PHY) header of the reservation frame.

Example 63 includes the subject matter of any one of Examples 54-62, and optionally, wherein the receiver is to receive a Contention Free-End (CF-End) frame indicating completion of the transmission of the wide-bandwidth data frame over the mmWave channel.

Example 64 includes the subject matter of any one of Examples 54-63, and optionally, wherein the receiver is to receive the reservation frame over a control mmWave channel.

Example 65 includes the subject matter of any one of Examples 54-64, and optionally, wherein the wide-bandwidth data frame is decodable over the wide-bandwidth mmWave channel, and the reservation frame is decodable over the mmWave channel.

Example 66 includes a system of wireless communication, the system comprising one or more antennas; a memory; a processor; a receiver to receive a wide-bandwidth data frame over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel, the receiver to receive the first and second headers over each of the plurality of mmWave channels, and to receive the data portion over the wide-bandwidth mmWave channel; and a message processor to process the wide-bandwidth data frame.

Example 67 includes the subject matter of Example 66, and optionally, wherein the receiver is to receive the same first header and the same second header over each of the plurality of mmWave channels.

Example 68 includes the subject matter of Example 66 or 67, and optionally, wherein the wide-bandwidth data frame includes a wide-bandwidth channel estimate field to estimate the wide-bandwidth mmWave channel.

Example 69 includes the subject matter of Example 68, and optionally, wherein the receiver is to receive the wide-bandwidth channel estimate field over the wide-bandwidth mmWave channel.

Example 70 includes the subject matter of Example 68, and optionally, wherein the receiver is to receive the wide-bandwidth channel estimate field over a narrow bandwidth between first and second channels of the plurality of mmWave channels.

Example 71 includes a method of wireless communication, the method comprising generating a wide-bandwidth data frame to be transmitted over a wide-bandwidth milli-meter-Wave (mmWave) channel, the wide-bandwidth mmWave channel including a plurality of mmWave channels; transmitting a plurality of reservation frames over the plurality of mmWave channels, a reservation frame of the plurality of reservation frames including a duration value corresponding to a duration of the wide-bandwidth data frame and a wide-bandwidth indication to indicate that the wide-bandwidth data frame is to be transmitted over the wide-bandwidth mmWave channel; and transmitting the wide-bandwidth data frame over the wide-bandwidth mmWave channel.

Example 72 includes the subject matter of Example 71, and optionally, wherein the duration value is to cover a duration of at least a transmission of the wide-bandwidth data frame, a short interframe space (SIFS), and a transmission of a response frame to the wide-bandwidth data frame.

Example 73 includes the subject matter of Example 71 or 72, and optionally, wherein the duration value is to indicate a duration of a transmit opportunity (TxOP) during which the wide-bandwidth data frame is to be transmitted.

Example 74 includes the subject matter of any one of Examples 71-73, and optionally, comprising, prior to the transmission of the wide-bandwidth data frame, receiving a plurality of response frames over the plurality mmWave channels.

Example 75 includes the subject matter of Example 74, and optionally, wherein the plurality of reservation frames includes Request To Send (RTS) frames, and the plurality of response frames includes Clear To Send (CTS) frames.

Example 76 includes the subject matter of Example 74, and optionally, wherein the plurality of reservation frames includes dedicated frames to reserve the plurality of mmWave channels for transmission of the wide-bandwidth data frame, and the plurality of response frames includes dedicated response frames to acknowledge the reservation frames.

Example 77 includes the subject matter of Example 74, and optionally, wherein the plurality of reservation frames includes Grant frames, and the plurality of response frames includes Grant Acknowledge (ACK) frames.

Example 78 includes the subject matter of any one of Examples 71-77, and optionally, wherein the wide-bandwidth indication is represented by one or more bits of a physical layer (PHY) header of the reservation frame.

Example 79 includes the subject matter of any one of Examples 71-78, and optionally, comprising transmitting a plurality of Contention Free-End (CF-End) frames over the plurality of mmWave channels to indicate completion of the transmission of the wide-bandwidth data frame.

Example 80 includes the subject matter of any one of Examples 71-79, and optionally, comprising transmitting at least one of the reservation frames over a control mmWave channel.

Example 81 includes the subject matter of any one of Examples 71-80, and optionally, wherein the wide-bandwidth data frame is decodable over the wide-bandwidth mmWave channel, and the reservation frames are decodable over respective channels of the plurality of mmWave channels.

Example 82 includes a method of wireless communication, the method comprising generating a wide-bandwidth data frame to be transmitted over a wide-bandwidth milli-meter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel; transmitting the first and second headers over each of the plurality of mmWave channels; and transmitting the data portion over the wide-bandwidth mmWave channel.

Example 83 includes the subject matter of Example 82, and optionally, comprising transmitting the same first header and the same second header over each of the plurality of mmWave channels.

Example 84 includes the subject matter of Example 82 or 83, and optionally, wherein the wide-bandwidth data frame includes a wide-bandwidth channel estimate field to estimate the wide-bandwidth mmWave channel.

Example 85 includes the subject matter of Example 84, and optionally, comprising transmitting the wide-bandwidth channel estimate field over the wide-bandwidth mmWave channel.

Example 86 includes the subject matter of Example 84, and optionally, comprising transmitting the wide-bandwidth channel estimate field over a narrow bandwidth between first and second channels of the plurality of mmWave channels.

Example 87 includes a method of wireless communication, the method comprising receiving at least one reservation frame over at least one millimeter-Wave (mmWave) mmWave channel, the reservation frame including a duration value corresponding to a duration of a wide-bandwidth data frame and a wide-bandwidth indication to indicate that the wide-bandwidth data frame is to be transmitted over a wide-bandwidth mmWave channel including a plurality of mmWave channels, the plurality of mmWave channels including the at least one mmWave channel; generating at least one response frame; transmitting the response frame over the mmWave channel; and processing the wide-bandwidth data frame to be received over the wide-bandwidth mmWave channel.

Example 88 includes the subject matter of Example 87, and optionally, comprising receiving a plurality of reservation frames over the plurality of mmWave channels, generating a plurality of response frames, and transmitting the plurality of response frames over the plurality of mmWave channels.

Example 89 includes the subject matter of Example 87 or 88, and optionally, wherein the duration value is to cover a duration of at least a transmission of the wide-bandwidth data frame, a short interframe space (SIFS), and a transmission of the response frame.

Example 90 includes the subject matter of any one of Examples 87-89, and optionally, wherein the duration value is to indicate a duration of a transmit opportunity (TxOP) during which the wide-bandwidth data frame is to be transmitted.

Example 91 includes the subject matter of any one of Examples 87-90, and optionally, comprising transmitting the response frame, prior to the transmission of the wide-bandwidth data frame.

Example 92 includes the subject matter of any one of Examples 87-91, and optionally, wherein the reservation frame includes a Request To Send (RTS) frame, and the response frame includes a Clear To Send (CTS) frame.

Example 93 includes the subject matter of any one of Examples 87-91, and optionally, wherein the reservation frame includes a dedicated frame to reserve the mmWave channel for transmission of the wide-bandwidth data frame, and the response frame includes a dedicated response frame to acknowledge the reservation frame.

Example 94 includes the subject matter of any one of Examples 87-91, and optionally, wherein the reservation frame includes a Grant frame, and the response frame includes a Grant Acknowledge (ACK) frame.

Example 95 includes the subject matter of any one of Examples 87-94, and optionally, wherein the wide-bandwidth indication is represented by one or more bits of a physical layer (PHY) header of the reservation frame.

Example 96 includes the subject matter of any one of Examples 87-95, and optionally, comprising receiving a Contention Free-End (CF-End) frame indicating completion of the transmission of the wide-bandwidth data frame over the mmWave channel.

Example 97 includes the subject matter of any one of Examples 87-96, and optionally, comprising receiving the reservation frame over a control mmWave channel.

Example 98 includes the subject matter of any one of Examples 87-97, and optionally, wherein the wide-bandwidth data frame is decodable over the wide-bandwidth mmWave channel, and the reservation frame is decodable over the mmWave channel.

Example 99 includes a method of wireless communication, the method comprising receiving a wide-bandwidth data frame over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel, wherein receiving the wide-bandwidth data frame comprises receiving the first and second headers over each of the plurality of mmWave channels, and receiving the data portion over the wide-bandwidth mmWave channel; and processing the wide-bandwidth data frame.

Example 100 includes the subject matter of Example 99, and optionally, comprising receiving the same first header and the same second header over each of the plurality of mmWave channels.

Example 101 includes the subject matter of Example 99 or 100, and optionally, wherein the wide-bandwidth data frame includes a wide-bandwidth channel estimate field to estimate the wide-bandwidth mmWave channel.

Example 102 includes the subject matter of Example 101, and optionally, comprising receiving the wide-bandwidth channel estimate field over the wide-bandwidth mmWave channel.

Example 103 includes the subject matter of Example 101, and optionally, comprising receiving the wide-bandwidth channel estimate field over a narrow bandwidth between first and second channels of the plurality of mmWave channels.

Example 104 includes a product including one or more tangible computer-readable non-transitory storage media comprising computer-executable instructions operable to, when executed by at least one computer processor, enable the at least one computer processor to implement a method, the method comprising generating a wide-bandwidth data frame to be transmitted over a wide-bandwidth millimeter-Wave (mmWave) channel, the wide-bandwidth mmWave channel including a plurality of mmWave channels; transmitting a plurality of reservation frames over the plurality of mmWave channels, a reservation frame of the plurality of reservation frames including a duration value corresponding to a duration of the wide-bandwidth data frame and a wide-bandwidth indication to indicate that the wide-bandwidth data frame is to be transmitted over the wide-bandwidth mmWave channel; and transmitting the wide-bandwidth data frame over the wide-bandwidth mmWave channel.

Example 105 includes the subject matter of Example 104, and optionally, wherein the duration value is to cover a duration of at least a transmission of the wide-bandwidth data frame, a short interframe space (SIFS), and a transmission of a response frame to the wide-bandwidth data frame.

Example 106 includes the subject matter of Example 104 or 105, and optionally, wherein the duration value is to indicate a duration of a transmit opportunity (TxOP) during which the wide-bandwidth data frame is to be transmitted.

Example 107 includes the subject matter of any one of Examples 104-106, and optionally, wherein the method comprises, prior to the transmission of the wide-bandwidth data frame, receiving a plurality of response frames over the plurality mmWave channels.

Example 108 includes the subject matter of Example 107, and optionally, wherein the plurality of reservation frames includes Request To Send (RTS) frames, and the plurality of response frames includes Clear To Send (CTS) frames.

Example 109 includes the subject matter of Example 107, and optionally, wherein the plurality of reservation frames includes dedicated frames to reserve the plurality of mmWave channels for transmission of the wide-bandwidth data frame, and the plurality of response frames includes dedicated response frames to acknowledge the reservation frames.

Example 110 includes the subject matter of Example 107, and optionally, wherein the plurality of reservation frames includes Grant frames, and the plurality of response frames includes Grant Acknowledge (ACK) frames.

Example 111 includes the subject matter of any one of Examples 104-110, and optionally, wherein the wide-bandwidth indication is represented by one or more bits of a physical layer (PHY) header of the reservation frame.

Example 112 includes the subject matter of any one of Examples 104-111, and optionally, wherein the method comprises transmitting a plurality of Contention Free-End (CF-End) frames over the plurality of mmWave channels to indicate completion of the transmission of the wide-bandwidth data frame.

Example 113 includes the subject matter of any one of Examples 104-112, and optionally, wherein the method comprises transmitting at least one of the reservation frames over a control mmWave channel.

Example 114 includes the subject matter of any one of Examples 104-113, and optionally, wherein the wide-bandwidth data frame is decodable over the wide-bandwidth mmWave channel, and the reservation frames are decodable over respective channels of the plurality of mmWave channels.

Example 115 includes a product including one or more tangible computer-readable non-transitory storage media comprising computer-executable instructions operable to, when executed by at least one computer processor, enable the at least one computer processor to implement a method, the method comprising generating a wide-bandwidth data frame to be transmitted over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel; transmitting the first and second headers over each of the plurality of mmWave channels; and transmitting the data portion over the wide-bandwidth mmWave channel.

Example 116 includes the subject matter of Example 115, and optionally, wherein the method comprises transmitting the same first header and the same second header over each of the plurality of mmWave channels.

Example 117 includes the subject matter of Example 115 or 116, and optionally, wherein the wide-bandwidth data frame includes a wide-bandwidth channel estimate field to estimate the wide-bandwidth mmWave channel.

Example 118 includes the subject matter of Example 117, and optionally, wherein the method comprises transmitting the wide-bandwidth channel estimate field over the wide-bandwidth mmWave channel.

Example 119 includes the subject matter of Example 117, and optionally, wherein the method comprises transmitting the wide-bandwidth channel estimate field over a narrow bandwidth between first and second channels of the plurality of mmWave channels.

Example 120 includes a product including one or more tangible computer-readable non-transitory storage media comprising computer-executable instructions operable to, when executed by at least one computer processor, enable the at least one computer processor to implement a method, the method comprising receiving at least one reservation frame over at least one millimeter-Wave (mmWave) mmWave channel, the reservation frame including a duration value corresponding to a duration of a wide-bandwidth data frame and a wide-bandwidth indication to indicate that the wide-bandwidth data frame is to be transmitted over a wide-bandwidth mmWave channel including a plurality of mmWave channels, the plurality of mmWave channels including the at least one mmWave channel; generating at least one response frame; transmitting the response frame over the mmWave channel; and processing the wide-bandwidth data frame to be received over the wide-bandwidth mmWave channel.

Example 121 includes the subject matter of Example 120, and optionally, wherein the method comprises receiving a plurality of reservation frames over the plurality of mmWave channels, generating a plurality of response frames, and transmitting the plurality of response frames over the plurality of mmWave channels.

Example 122 includes the subject matter of Example 120 or 121, and optionally, wherein the duration value is to cover a duration of at least a transmission of the wide-bandwidth data frame, a short interframe space (SIFS), and a transmission of the response frame.

Example 123 includes the subject matter of any one of Examples 120-122, and optionally, wherein the duration value is to indicate a duration of a transmit opportunity (TxOP) during which the wide-bandwidth data frame is to be transmitted.

Example 124 includes the subject matter of any one of Examples 120-123, and optionally, wherein the method comprises transmitting the response frame, prior to the transmission of the wide-bandwidth data frame.

Example 125 includes the subject matter of any one of Examples 120-124, and optionally, wherein the reservation frame includes a Request To Send (RTS) frame, and the response frame includes a Clear To Send (CTS) frame.

Example 126 includes the subject matter of any one of Examples 120-124, and optionally, wherein the reservation frame includes a dedicated frame to reserve the mmWave channel for transmission of the wide-bandwidth data frame, and the response frame includes a dedicated response frame to acknowledge the reservation frame.

Example 127 includes the subject matter of any one of Examples 120-124, and optionally, wherein the reservation frame includes a Grant frame, and the response frame includes a Grant Acknowledge (ACK) frame.

Example 128 includes the subject matter of any one of Examples 120-127, and optionally, wherein the wide-bandwidth indication is represented by one or more bits of a physical layer (PHY) header of the reservation frame.

Example 129 includes the subject matter of any one of Examples 120-128, and optionally, wherein the method comprises receiving a Contention Free-End (CF-End) frame indicating completion of the transmission of the wide-bandwidth data frame over the mmWave channel.

Example 130 includes the subject matter of any one of Examples 120-129, and optionally, wherein the method comprises receiving the reservation frame over a control mmWave channel.

Example 131 includes the subject matter of any one of Examples 120-130, and optionally, wherein the wide-bandwidth data frame is decodable over the wide-bandwidth mmWave channel, and the reservation frame is decodable over the mmWave channel.

Example 132 includes a product including one or more tangible computer-readable non-transitory storage media comprising computer-executable instructions operable to, when executed by at least one computer processor, enable the at least one computer processor to implement a method, the method comprising receiving a wide-bandwidth data frame over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel, wherein receiving the wide-bandwidth data frame comprises receiving the first and second headers over each of the plurality of mmWave channels, and receiving the data portion over the wide-bandwidth mmWave channel; and processing the wide-bandwidth data frame.

Example 133 includes the subject matter of Example 132, and optionally, wherein the method comprises receiving the same first header and the same second header over each of the plurality of mmWave channels.

Example 134 includes the subject matter of Example 132 or 133, and optionally, wherein the wide-bandwidth data frame includes a wide-bandwidth channel estimate field to estimate the wide-bandwidth mmWave channel.

Example 135 includes the subject matter of Example 134, and optionally, wherein the method comprises receiving the wide-bandwidth channel estimate field over the wide-bandwidth mmWave channel.

Example 136 includes the subject matter of Example 134, and optionally, wherein the method comprises receiving the wide-bandwidth channel estimate field over a narrow bandwidth between first and second channels of the plurality of mmWave channels.

Example 137 includes an apparatus of wireless communication, the apparatus comprising means for generating a wide-bandwidth data frame to be transmitted over a wide-bandwidth millimeter-Wave (mmWave) channel, the wide-bandwidth mmWave channel including a plurality of mmWave channels; means for transmitting a plurality of reservation frames over the plurality of mmWave channels, a reservation frame of the plurality of reservation frames including a duration value corresponding to a duration of the wide-bandwidth data frame and a wide-bandwidth indication to indicate that the wide-bandwidth data frame is to be transmitted over the wide-bandwidth mmWave channel; and means for transmitting the wide-bandwidth data frame over the wide-bandwidth mmWave channel.

Example 138 includes the subject matter of Example 137, and optionally, wherein the duration value is to cover a duration of at least a transmission of the wide-bandwidth data frame, a short interframe space (SIFS), and a transmission of a response frame to the wide-bandwidth data frame.

Example 139 includes the subject matter of Example 137 or 138, and optionally, wherein the duration value is to indicate a duration of a transmit opportunity (TxOP) during which the wide-bandwidth data frame is to be transmitted.

Example 140 includes the subject matter of any one of Examples 137-139, and optionally, comprising means for, prior to the transmission of the wide-bandwidth data frame, receiving a plurality of response frames over the plurality mmWave channels.

Example 141 includes the subject matter of Example 140, and optionally, wherein the plurality of reservation frames includes Request To Send (RTS) frames, and the plurality of response frames includes Clear To Send (CTS) frames.

Example 142 includes the subject matter of Example 140, and optionally, wherein the plurality of reservation frames includes dedicated frames to reserve the plurality of mmWave channels for transmission of the wide-bandwidth data frame, and the plurality of response frames includes dedicated response frames to acknowledge the reservation frames.

Example 143 includes the subject matter of Example 140, and optionally, wherein the plurality of reservation frames includes Grant frames, and the plurality of response frames includes Grant Acknowledge (ACK) frames.

Example 144 includes the subject matter of any one of Examples 137-143, and optionally, wherein the wide-bandwidth indication is represented by one or more bits of a physical layer (PHY) header of the reservation frame.

Example 145 includes the subject matter of any one of Examples 137-144, and optionally, comprising means for transmitting a plurality of Contention Free-End (CF-End) frames over the plurality of mmWave channels to indicate completion of the transmission of the wide-bandwidth data frame.

Example 146 includes the subject matter of any one of Examples 137-145, and optionally, comprising means for transmitting at least one of the reservation frames over a control mmWave channel.

Example 147 includes the subject matter of any one of Examples 137-146, and optionally, wherein the wide-bandwidth data frame is decodable over the wide-bandwidth mmWave channel, and the reservation frames are decodable over respective channels of the plurality of mmWave channels.

Example 148 includes an apparatus of wireless communication, the apparatus comprising means for generating a wide-bandwidth data frame to be transmitted over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel; means for transmitting the first and second headers over each of the plurality of mmWave channels; and means for transmitting the data portion over the wide-bandwidth mmWave channel.

Example 149 includes the subject matter of Example 148, and optionally, comprising means for transmitting the same first header and the same second header over each of the plurality of mmWave channels.

Example 150 includes the subject matter of Example 148 or 149, and optionally, wherein the wide-bandwidth data frame includes a wide-bandwidth channel estimate field to estimate the wide-bandwidth mmWave channel.

Example 151 includes the subject matter of Example 150, and optionally, comprising means for transmitting the wide-bandwidth channel estimate field over the wide-bandwidth mmWave channel.

Example 152 includes the subject matter of Example 150, and optionally, comprising means for transmitting the wide-bandwidth channel estimate field over a narrow bandwidth between first and second channels of the plurality of mmWave channels.

Example 153 includes an apparatus of wireless communication, the apparatus comprising means for receiving at least one reservation frame over at least one millimeter-Wave (mmWave) mmWave channel, the reservation frame including a duration value corresponding to a duration of a wide-bandwidth data frame and a wide-bandwidth indication to indicate that the wide-bandwidth data frame is to be transmitted over a wide-bandwidth mmWave channel including a plurality of mmWave channels, the plurality of mmWave channels including the at least one mmWave channel; means for generating at least one response frame; means for transmitting the response frame over the mmWave channel; and means for processing the wide-bandwidth data frame to be received over the wide-bandwidth mmWave channel.

Example 154 includes the subject matter of Example 153, and optionally, comprising means for receiving a plurality of reservation frames over the plurality of mmWave channels, means for generating a plurality of response frames, and means for transmitting the plurality of response frames over the plurality of mmWave channels.

Example 155 includes the subject matter of Example 153 or 154, and optionally, wherein the duration value is to cover a duration of at least a transmission of the wide-bandwidth data frame, a short interframe space (SIFS), and a transmission of the response frame.

Example 156 includes the subject matter of any one of Examples 153-155, and optionally, wherein the duration value is to indicate a duration of a transmit opportunity (TxOP) during which the wide-bandwidth data frame is to be transmitted.

Example 157 includes the subject matter of any one of Examples 153-156, and optionally, comprising means for transmitting the response frame, prior to the transmission of the wide-bandwidth data frame.

Example 158 includes the subject matter of any one of Examples 153-157, and optionally, wherein the reservation frame includes a Request To Send (RTS) frame, and the response frame includes a Clear To Send (CTS) frame.

Example 159 includes the subject matter of any one of Examples 153-157, and optionally, wherein the reservation frame includes a dedicated frame to reserve the mmWave channel for transmission of the wide-bandwidth data frame, and the response frame includes a dedicated response frame to acknowledge the reservation frame.

Example 160 includes the subject matter of any one of Examples 153-157, and optionally, wherein the reservation frame includes a Grant frame, and the response frame includes a Grant Acknowledge (ACK) frame.

Example 161 includes the subject matter of any one of Examples 153-160, and optionally, wherein the wide-bandwidth indication is represented by one or more bits of a physical layer (PHY) header of the reservation frame.

Example 162 includes the subject matter of any one of Examples 153-161, and optionally, comprising means for receiving a Contention Free-End (CF-End) frame indicating completion of the transmission of the wide-bandwidth data frame over the mmWave channel.

Example 163 includes the subject matter of any one of Examples 153-162, and optionally, comprising means for receiving the reservation frame over a control mmWave channel.

Example 164 includes the subject matter of any one of Examples 153-163, and optionally, wherein the wide-bandwidth data frame is decodable over the wide-bandwidth mmWave channel, and the reservation frame is decodable over the mmWave channel.

Example 165 includes an apparatus of wireless communication, the apparatus comprising means for receiving a wide-bandwidth data frame over a wide-bandwidth millimeter-Wave (mmWave) channel, the wide-bandwidth mmWave channel including a plurality of mmWave channels, the wide-bandwidth data frame including a first header, a second header, and a data portion, the first header includes an indication of the second header, and the second header includes an indication of the wide-bandwidth mmWave channel, wherein receiving the wide-bandwidth data frame comprises receiving the first and second headers over each of the plurality of mmWave channels, and receiving the data portion over the wide-bandwidth mmWave channel; and means for processing the wide-bandwidth data frame.

Example 166 includes the subject matter of Example 165, and optionally, comprising means for receiving the same first header and the same second header over each of the plurality of mmWave channels.

Example 167 includes the subject matter of Example 165 or 166, and optionally, wherein the wide-bandwidth data frame includes a wide-bandwidth channel estimate field to estimate the wide-bandwidth mmWave channel.

Example 168 includes the subject matter of Example 167, and optionally, comprising means for receiving the wide-bandwidth channel estimate field over the wide-bandwidth mmWave channel.

Example 169 includes the subject matter of Example 167, and optionally, comprising means for receiving the wide-bandwidth channel estimate field over a narrow bandwidth between first and second channels of the plurality of mmWave channels.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a first wireless communication station (STA) to:
    transmit a Request to Send (RTS) frame to a second STA to establish a Transmission Opportunity (TxOP), the RTS frame duplicated over a plurality of channels in a frequency band above 45 Gigahertz (GHz), a header field of the RTS frame comprising a bandwidth indication of a channel bandwidth comprising the plurality of channels;
    receive a Clear to Send (CTS) frame from the second STA duplicated over at least first and second channels of the plurality of channels; and
    transmit a data transmission to the second STA during the TxOP, wherein the data transmission comprises a first portion and a second portion different from the first portion, the first portion of the data transmission duplicated in at least first and second duplicate transmissions over the at least first and second channels, respectively, and wherein the second portion of the data transmission comprises a wide-bandwidth transmission over a wide channel bandwidth comprising the at least first and second channels, the second portion comprising at least a data field.

2. The apparatus of claim 1, wherein the header field of the RTS frame comprises a scrambler initialization field, the scrambler initialization field comprising a plurality of bits to indicate the channel bandwidth comprising the plurality of channels.

3. The apparatus of claim 2, wherein the plurality of bits is to identify which channels are included in the plurality of channels.

4. The apparatus of claim 1 configured to cause the first STA to transmit a Contention-Free End (CF-END) frame to indicate truncation of the TXOP.

5. The apparatus of claim 4 configured to cause the first STA to transmit the CF-END frame duplicated over the at least first and second channels.

6. The apparatus of claim 1, wherein the first portion of the data transmission comprises at least a Short Training Field (STF), a Channel Estimation (CE) field, a first header field, and a second header field.

7. The apparatus of claim 1 configured to cause the first STA to receive the CTS frame duplicated over the plurality of channels.

8. The apparatus of claim 6, wherein the first header field comprises an indication of the second header field.

9. The apparatus of claim 1, wherein the first portion of the data transmission comprises a first Channel Estimation (CE) field, and the second portion of the data transmission comprises a second CE field.

10. The apparatus of claim 1, wherein the first portion of the data transmission is decodable by a directional multi-gigabit (DMG) station.

11. The apparatus of claim 1, wherein the RTS frame is decodable by a directional multi-gigabit (DMG) station.

12. The apparatus of claim 1 comprising a Medium Access Control (MAC), and a Physical Layer (PHY).

13. The apparatus of claim 1 comprising a radio.

14. The apparatus of claim 1 comprising one or more antennas.

15. A product comprising one or more tangible computer-readable non-transitory storage media comprising computer-executable instructions operable to, when executed by at least one processor, enable the at least one processor to cause a first wireless communication station (STA) to:
  transmit a Request to Send (RTS) frame to a second STA to establish a Transmission Opportunity (TxOP), the RTS frame duplicated over a plurality of channels in a frequency band above 45 Gigahertz (GHz), a header field of the RTS frame comprising a bandwidth indication of a channel bandwidth comprising the plurality of channels;
  receive a Clear to Send (CTS) frame from the second STA duplicated over at least first and second channels of the plurality of channels; and
  transmit a data transmission to the second STA during the TxOP, wherein the data transmission comprises a first portion and a second portion different from the first portion, the first portion of the data transmission duplicated in at least first and second duplicate transmissions over the at least first and second channels, respectively, and wherein the second portion of the data transmission comprises a wide-bandwidth transmission over a wide channel bandwidth comprising the at least first and second channels, the second portion comprising at least a data field.

16. The product of claim 15, wherein the header field of the RTS frame comprises a scrambler initialization field, the scrambler initialization field comprising a plurality of bits to indicate the channel bandwidth comprising the plurality of channels.

17. The product of claim 15, wherein the instructions, when executed, cause the first STA to transmit a Contention-Free End (CF-END) frame to indicate truncation of the TXOP.

18. The product of claim 17, wherein the instructions, when executed, cause the first STA to transmit the CF-END frame duplicated over the at least first and second channels.

19. The product of claim 15, wherein the first portion of the data transmission comprises at least a Short Training Field (STF), a Channel Estimation (CE) field, a first header field, and a second header field.

20. The product of claim 15, wherein the instructions, when executed, cause the first STA to receive the CTS frame duplicated over the plurality of channels.

21. The product of claim 19, wherein the first header field comprises an indication of the second header field.

22. The product of claim 15, wherein the first portion of the data transmission comprises a first Channel Estimation (CE) field, and the second portion of the data transmission comprises a second CE field.

23. The product of claim 15, wherein the first portion of the data transmission is decodable by a directional multi-gigabit (DMG) station.

24. The product of claim 15, wherein the RTS frame is decodable by a directional multi-gigabit (DMG) station.

25. An apparatus comprising:
  means for causing a first wireless communication station (STA) to transmit a Request to Send (RTS) frame to a second STA to establish a Transmission Opportunity (TxOP), the RTS frame duplicated over a plurality of channels in a frequency band above 45 Gigahertz (GHz), a header field of the RTS frame comprising a bandwidth indication of a channel bandwidth comprising the plurality of channels;
  means for causing the first STA to receive a Clear to Send (CTS) frame from the second STA duplicated over at least first and second channels of the plurality of channels; and
  means for causing the first STA to transmit a data transmission to the second STA during the TxOP, wherein the data transmission comprises a first portion and a second portion different from the first portion, the first portion of the data transmission duplicated in at least first and second duplicate transmissions over the at least first and second channels, respectively, and wherein the second portion of the data transmission comprises a wide-bandwidth transmission over a wide channel bandwidth comprising the at least first and second channels, the second portion comprising at least a data field.

26. The apparatus of claim 25, wherein the header field of the RTS frame comprises a scrambler initialization field, the scrambler initialization field comprising a plurality of bits to indicate the channel bandwidth comprising the plurality of channels.

27. The apparatus of claim 25 comprising means for causing the first STA to transmit a Contention-Free End (CF-END) frame to indicate truncation of the TXOP.

* * * * *